United States Patent
Ito et al.

(10) Patent No.: US 11,117,624 B2
(45) Date of Patent: Sep. 14, 2021

(54) AUTOMOTIVE FRAMEWORK MEMBER

(71) Applicant: NIPPON STEEL CORPORATION, Tokyo (JP)

(72) Inventors: Yasuhiro Ito, Tokyo (JP); Hiroki Fujimoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/057,617

(22) PCT Filed: Oct. 30, 2019

(86) PCT No.: PCT/JP2019/042630
§ 371 (c)(1),
(2) Date: Nov. 20, 2020

(87) PCT Pub. No.: WO2020/090916
PCT Pub. Date: May 7, 2020

(65) Prior Publication Data
US 2021/0147002 A1    May 20, 2021

(30) Foreign Application Priority Data
Oct. 31, 2018    (JP) .............................. JP2018-205025

(51) Int. Cl.
*B60J 7/00*    (2006.01)
*B62D 25/04*    (2006.01)
(Continued)

(52) U.S. Cl.
CPC ............. *B62D 25/04* (2013.01); *B62D 21/15* (2013.01); *B62D 25/025* (2013.01); *B62D 25/06* (2013.01)

(58) Field of Classification Search
CPC .......... C22C 38/02; C22C 38/04; C22C 38/06; C22C 38/001; C21D 9/46; B32B 15/08;
(Continued)

(56) References Cited

U.S. PATENT DOCUMENTS 5,388,885 A * 2/1995 Warren ................. B62D 21/14
296/203.03
6,419,305 B1 * 7/2002 Larsen ................... B62D 25/04
296/187.02
(Continued)

FOREIGN PATENT DOCUMENTS

EP    3 006 131 A1    4/2016
JP    2013-71532 A    4/2013
(Continued)

OTHER PUBLICATIONS

Decision to Grant a Patent dated Feb. 28, 2020 in corresponding Japanese Patent Application No. 2020-503332, with English translation.

*Primary Examiner* — Kiran B Patel
(74) *Attorney, Agent, or Firm* — Birch, Stewart, Kolasch & Birch, LLP

(57) ABSTRACT

An automotive framework member 1 includes a first steel sheet 10, a second steel sheet 20, and a first weld metal part 40 joining an interface between the first steel sheet 10 and the second steel sheet 20, in which tensile strength of the first steel sheet 10 is 1.0 GPa or more and 1.6 GPa or less, tensile strength of the second steel sheet 20 is 1.8 GPa or more and 2.5 GPa or less, the first steel sheet 10 includes a groove part 18, the second steel sheet 20 is overlapped with the groove part 18, and a minimum Vickers hardness of a region within 4 mm of a periphery of the first weld metal part 40 of the second steel sheet 20 is 80% or more of a hardness of an outside of the region of the second steel sheet 20.

4 Claims, 14 Drawing Sheets

(51) Int. Cl.
*B62D 21/15* (2006.01)
*B62D 25/02* (2006.01)
*B62D 25/06* (2006.01)

(58) Field of Classification Search
CPC ....... B32B 15/18; C04B 14/204; C04B 20/02; B23K 2103/04
See application file for complete search history.

(56) References Cited

U.S. PATENT DOCUMENTS

| | | | | |
|---|---|---|---|---|
| 9,090,291 | B1* | 7/2015 | Kanagai | B62D 25/025 |
| 2008/0036235 | A1* | 2/2008 | Ameloot | B62D 25/04 |
| | | | | 296/102 |
| 2009/0102233 | A1* | 4/2009 | Tomozawa | B62D 25/04 |
| | | | | 296/187.02 |
| 2010/0127532 | A1* | 5/2010 | Hosaka | B62D 25/06 |
| | | | | 296/193.06 |
| 2011/0206890 | A1* | 8/2011 | Belpaire | B62D 29/001 |
| | | | | 428/68 |
| 2011/0241384 | A1* | 10/2011 | Mori | B62D 25/04 |
| | | | | 296/193.06 |
| 2013/0049391 | A1* | 2/2013 | Kurogi | B62D 25/025 |
| | | | | 296/30 |
| 2013/0140851 | A1* | 6/2013 | Zornack | B62D 25/04 |
| | | | | 296/193.06 |
| 2013/0257097 | A1* | 10/2013 | Kojo | B62D 21/15 |
| | | | | 296/187.08 |
| 2015/0028627 | A1* | 1/2015 | Fellague | B62D 21/157 |
| | | | | 296/187.13 |
| 2015/0145283 | A1* | 5/2015 | Nishino | B62D 25/145 |
| | | | | 296/187.1 |
| 2015/0175218 | A1* | 6/2015 | Yoshioka | B62D 25/025 |
| | | | | 296/203.01 |
| 2015/0360725 | A1* | 12/2015 | Yoshida | B62D 21/157 |
| | | | | 296/203.01 |
| 2016/0016612 | A1* | 1/2016 | Torikawa | B62D 25/14 |
| | | | | 280/784 |
| 2016/0257348 | A1 | 9/2016 | Balur et al. | |
| 2017/0247057 | A1* | 8/2017 | Tatsuwaki | B62D 25/145 |
| 2017/0349216 | A1* | 12/2017 | Akhlaque-E-Rasul | B62D 29/005 |
| 2018/0043939 | A1* | 2/2018 | Kitaguchi | B62D 25/06 |
| 2019/0009829 | A1* | 1/2019 | Shirakami | B62D 21/15 |
| 2019/0039658 | A1* | 2/2019 | Yokoi | B62D 25/06 |
| 2019/0092395 | A1* | 3/2019 | Makowski | B62D 25/025 |
| 2019/0152529 | A1* | 5/2019 | Otoguro | B62D 29/007 |
| 2019/0161128 | A1* | 5/2019 | Abke | B62D 29/008 |
| 2019/0226508 | A1* | 7/2019 | Kurokawa | B23K 11/20 |
| 2019/0300060 | A1* | 10/2019 | Otsuka | B21D 22/208 |
| 2019/0300073 | A1* | 10/2019 | Suzumura | B62D 25/025 |
| 2020/0139911 | A1* | 5/2020 | Hirose | B62D 25/04 |
| 2020/0180699 | A1* | 6/2020 | Hirose | B62D 25/00 |
| 2020/0198703 | A1* | 6/2020 | Hirose | B62D 21/152 |
| 2020/0338661 | A1* | 10/2020 | Hirose | B23K 11/0026 |
| 2020/0353989 | A1* | 11/2020 | Sakai | B62D 27/023 |
| 2020/0353990 | A1* | 11/2020 | Kosaka | B62D 25/04 |
| 2020/0353991 | A1* | 11/2020 | Sakai | B62D 65/02 |
| 2020/0353995 | A1* | 11/2020 | Alwan | B62D 27/065 |
| 2020/0385064 | A1* | 12/2020 | Desaki | B62D 27/02 |
| 2021/0039718 | A1* | 2/2021 | Koga | B62D 21/15 |

FOREIGN PATENT DOCUMENTS

| | | |
|---|---|---|
| JP | 2013-189173 A | 9/2013 |
| JP | 2015-003552 A | 1/2015 |
| JP | 2016-124029 A | 7/2016 |

\* cited by examiner

AUTOMOTIVE FRAMEWORK MEMBER

TECHNICAL FIELD

The present disclosure relates to an automotive framework member.

BACKGROUND ART

In recent years, in order to reduce emissions of carbon dioxide contained in an exhaust gas of automobile, and to improve fuel economy, a reduction in weight of a vehicle body is demanded. In order to realize further reduction in weight of a vehicle body, it is desirable to optimize a member shape by increasing a sheet thickness at a place required to have high strength and reducing a sheet thickness at a place where high strength is not required, and the like, for example.

Further, an automotive framework member is demanded to further improve strength and to further improve an impact absorption characteristic which is required to protect an inside of a vehicle body framework when a collision occurs.

Patent Document 1 below describes a technique in which, in an automotive framework member, welding is performed in a state where a reinforcing member is partially overlapped with a main body member, to thereby realize both high strength and reduction in weight. Further, Patent Document 2 below describes a technique in which a first blank and a second blank are welded, and then subjected to hot press molding.

PRIOR ART DOCUMENT

Patent Document

Patent Document 1: Japanese Laid-open Patent Publication No. 2013-71532
Patent Document 2: Japanese Laid-open Patent Publication No. 2013-189173

DISCLOSURE OF THE INVENTION

Problems to be Solved by the Invention

However, when members are welded to each other, in a peripheral region of a weld metal part of a weld, a characteristic and a structure thereof are known to change to be different from those of a base metal, due to heat input at a time of performing the welding. The peripheral region is referred to as HAZ (Heat Affected Zone).

In the technique described in the above Patent Document 1, a strength reduction in the HAZ between the main body member and the reinforcing member is not taken into consideration, and thus there is a problem that there is room for improvement from a viewpoint of the improvement of strength. Further, there is also a problem that there is room for improvement regarding the impact absorption characteristic required of the framework member as well.

Further, in the technique described in the above Patent Document 2, although the improvement of strength in the HAZ can be expected by the hot press molding, there is room for further improvement regarding joining strength of mutual members.

Accordingly, the present disclosure has been made in view of the above-described problems, and an object of the present invention is to provide a framework member which is new and improved, and which is capable of realizing both improvement of strength of the whole member including a weld and improvement of an impact absorption characteristic at a higher level, and capable of improving joining strength of mutual members.

Means for Solving the Problems

In order to solve the above-described problems, according to the present disclosure, there is provided an automotive framework member including a first steel sheet, a second steel sheet, and a first weld metal part joining an interface between the first steel sheet and the second steel sheet, in which tensile strength of the first steel sheet is 1.0 GPa or more and 1.6 GPa or less, tensile strength of the second steel sheet is 1.8 GPa or more and 2.5 GPa or less, the first steel sheet includes a groove part, the second steel sheet is overlapped with the groove part, and a minimum Vickers hardness of a region within 4 mm of a periphery of the first weld metal part of the second steel sheet is 80% or more of a hardness of an outside of the region of the second steel sheet.

The Vickers hardness of the first weld metal part may be 400 or more and 540 or less.

It is also possible that the first steel sheet includes flange parts on outer sides of the groove part, and the automotive framework member further includes a third steel sheet, and second weld metal parts joining interfaces between the third steel sheet and the flange parts, in which tensile strength of the third steel sheet is 0.45 GPa or more and 1.6 GPa or less.

Effect of the Invention

According to the present disclosure, there is provided an automotive framework member capable of realizing both improvement of strength of the whole framework member and improvement of an impact absorption characteristic at a higher level, and capable of improving joining strength of mutual members.

EMBODIMENTS FOR CARRYING OUT THE INVENTION

Hereinafter, embodiments of the present disclosure will be described in detail while referring to the attached drawings. Note that in the present description and the drawings, components having substantially the same functional configurations are denoted by the same codes to omit overlapped explanation.

1. First Embodiment

[Example of External Appearance of Framework Member]

First, a schematic configuration of an automotive framework member 1 according to the first embodiment of the present disclosure will be described while referring to FIG. 1. Note that hereinbelow, the "automotive framework member" is sometimes abbreviated to be referred to as a "framework member".

Figure 1:
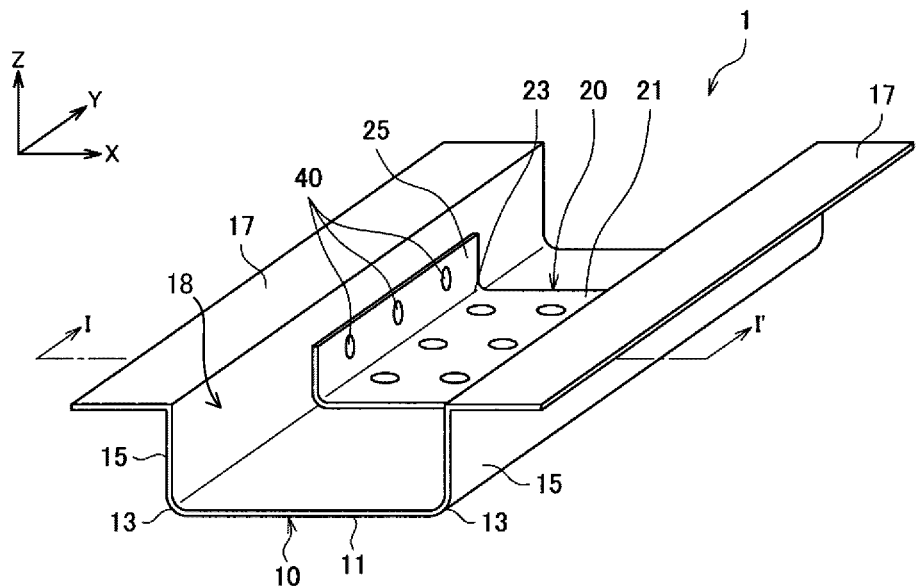
FIG. 1 is a perspective view illustrating one example of an automotive framework member according to a first embodiment of the present disclosure.

FIG. 1 is a perspective view illustrating one example of the framework member 1 according to the present embodiment. As illustrated in FIG. 1, as one example, the framework member 1 is a member that extends by setting a Y direction illustrated in FIG. 1 to a longitudinal direction, and in a cross sectional view (of X-Z plane) along a short side direction, the member has a rectangular shape opened in a Z direction. In particular, the framework member 1 has a substantially hat shape in the cross-sectional view (of X-Z plane) along the short side direction. The framework member 1 is formed in a manner that a first steel sheet 10 and a second steel sheet 20 are overlapped with each other. The first steel sheet 10 and the second steel sheet 20 are integrated by being welded via a plurality of first weld metal parts 40.

The first steel sheet 10 is a member which is formed in a substantially hat shape in the cross-sectional view of X-Z plane in FIG. 1, and forms an outer shape of the framework member 1. The first steel sheet 10 has a first top wall part 11, first vertical wall parts 15 bent from the first top wall part 11 via first bent parts 13, and flange parts 17 bent outward from end portions of the first vertical wall parts 15 on a side opposite to the first top wall part 11 side. The first steel sheet 10 includes a groove part 18 configured by providing the first vertical wall parts 15 bent via the first bent parts 13, on both sides of the first top wall part 11. Further, the first steel sheet 10 includes the flange parts 17 arranged on both outer sides of the groove part 18.

Note that when the flange parts 17 are welded to a plate-shaped member (which is not illustrated, and which corresponds to a plate-shaped member 30 as a third steel sheet to be described later), the framework member 1 can be formed to have a closed cross sectional shape, Here, the cross section of X-Z plane in FIG. 1 is a plane perpendicular to edge lines of the first bent parts 13. Intersection lines between a virtual plane formed by extending an outer surface of the first top wall part 11 and virtual planes formed by extending outer surfaces of the first vertical wall parts 15, are set as the edge lines of the first bent parts 13.

The second steel sheet 20 is formed in a rectangular shape whose one side is opened, in the cross-sectional view of X-Z plane in FIG. 1. The second steel sheet 20 has a second top wall part 21, and second vertical wall parts 25 extended from the second top wall part 21 via second bent parts 23. The second steel sheet 20 is attached by being overlapped with an inner wall surface of the substantially hat shape of the first steel sheet 10, to thereby, function as a reinforcing member. Specifically, since the second steel sheet 20 is attached by being overlapped with the inner side of the substantially hat shape of the first steel sheet 10, it is possible to increase a sheet thickness of the framework member 1, resulting in that strength as a whole framework member 1 is improved.

The second steel sheet 20 may be partially provided in the longitudinal direction of the first steel sheet 10. Further, the second steel sheet 20 may be provided by being extended along the longitudinal direction of the first steel sheet 10 (the Y direction in FIG. 1). Furthermore, the second steel sheet 20 may be provided on an outer wall surface of the substantially hat shape of the first steel sheet 10.

The second steel sheet 20 is not limited to have the rectangular shape whose one side is opened, in the cross-sectional view of X-Z, plane in FIG. 1. For example, the second steel sheet 20 may be a member having an L-shaped cross section. In this case, the second steel sheet 20 is attached to an inner side or an outer side of the bent first bent part 13 of the first steel sheet 10.

The second steel sheet 20 is only required to be overlapped with the first steel sheet 10 at the groove part 18, and any of the following cases may be employed, which are, a case where the second steel sheet 20 is arranged on the inner side or the outer side of the first top wall part 11 and the first vertical wall parts 15 on both sides of the first top wall part 11 of the first steel sheet 10, a case where the second steel sheet 20 is arranged on the inner side or the outer side of the first top wall part 11 and only one of the first vertical wall parts 15 of the first steel sheet 10, and a case where the second steel sheet 20 is arranged on the inner side or the outer side of any of the first top wall part 11 and the first vertical wall part 15 of the first steel sheet 10.

As a material composing the first steel sheet 10, there can be cited a steel sheet having tensile strength of 1.0 GPa or more and 1.6 GPa or less. Further, as the material composing the first steel sheet 10, a steel sheet having the tensile strength of 1.5 GPa or less is desirable. Furthermore, as the material composing the first steel sheet 10, a steel sheet having the tensile strength of 1.35 GPa or less is desirable. Note that the tensile strength of the first steel sheet 10 mentioned in the present disclosure, is tensile strength after performing hardness control through a hot stamping method to be described later. As a sheet thickness of a steel sheet used as the first steel sheet 10, about 0.9 to 2.3 trim can be cited. Further, it is possible to set a carbon component in the steel sheet used as the first steel sheet 10 to 0.23 mass % or less. Furthermore, it is possible to set the carbon component in the steel sheet used as the first steel sheet 10 to 0.16 mass % or less. By reducing the carbon component in the steel sheet, it is possible to suppress a toughness reduction of the first weld metal part 40.

As a material composing the second steel sheet 20, there can be cited a steel sheet having tensile strength of 1.8 GPa or more and 2.5 GPa or less. From a viewpoint of weldability, the tensile strength of 2.15 GPa or less is further desirable. Note that the tensile strength of the second steel sheet 20 mentioned in the present disclosure, is tensile strength after performing hardness control through the hot stamping method to be described later. Note that when a tensile test sample cannot be collected, converted Vickers hardness can be used as the tensile strength. For the conversion of hardness, a conversion table of hardness of JIS (SAE J 417, revised in 1983) may be used. The tensile strengths of 2.15 GPa and 2.5 GPa, which are not listed in the conversion table of hardness, are regarded as Hv618 and Hv720, respectively. As a sheet thickness of a steel sheet used as the second steel sheet 20, about 0.9 to 2.6 mm can be cited. A carbon component in the steel material used for the second steel sheet 20 can be set to 0.27% or more and 0.38% or less, for example, in order to secure strength as a reinforcing material.

The first steel sheet 10 and the second steel sheet 20 may have the same sheet thickness or different sheet thicknesses. When they have different sheet thicknesses, by making the first steel sheet 10 which forms an outer shape of the framework member 1 have a small sheet thickness, and on the other hand, by making the second steel sheet 20 as the reinforcing member have a relatively large thickness, it is possible to reduce the weight of the framework member 1 as a whole, while securing the strength.

[Hardness of Peripheral Region of First Weld Metal Part]

Figure 2:
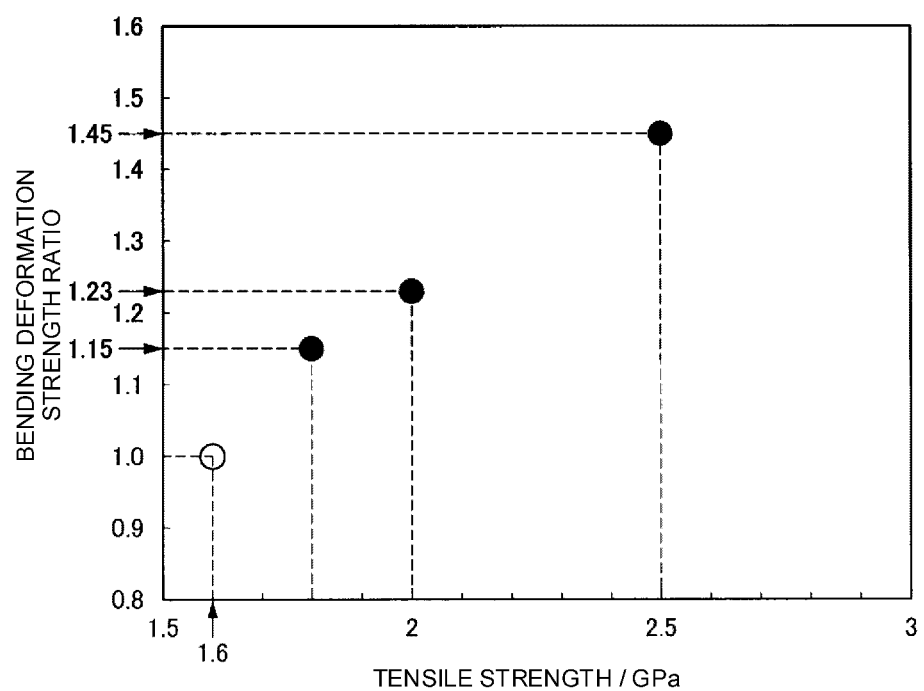
FIG. 2 is a graph illustrating a relation between a strength ratio of the automotive framework member according to the same embodiment and tensile strength of a second steel sheet.

An effect of improving strength of the framework member 1 realized by the second steel sheet 20, will be concretely described while referring to FIG. 2. FIG. 2 is a graph illustrating a relation between a bending strength ratio of the framework member 1 according to the present embodiment and tensile strength of the second steel sheet 20. In FIG. 2, bending strength of the framework member 1 when a steel sheet of the second steel sheet 20 is set to a steel sheet having tensile strength of 1.6 GPa which is an upper limit of a strength class of a steel sheet used for the first steel sheet 10, is set to 1, and is set as a comparison object (white circle in FIG. 2). At this time, when a steel sheet having tensile strength of 1.8 GPa is used as the second steel sheet 20, the bending strength ratio of the framework member 1 indicates a value of about 1.15. Specifically, by making the steel sheet of the second steel sheet 20 have the tensile strength of 1.8 GPa or more, the strength as a whole framework member 1 is improved. Further, when a steel sheet having tensile strength of 2.0 GPa is used as the second steel sheet 20, the bending strength ratio of the framework member 1 indicates a value of about 1.23. Furthermore, when a steel sheet having tensile strength of 2.5 GPa is used as the second steel sheet 20, the bending strength ratio of the framework member 1 indicates a value of about 1.45.

As described above, by using the steel sheet having the tensile strength of 1.8 GPa or more as the second steel sheet 20, even if the steel sheet with 1.6 GPa or less is used as the first steel sheet 10, it is possible to improve the strength of the whole framework member 1.

On the other hand, when the tensile strength of the second steel sheet 20 becomes excessively high, there is a possibility that the hardness of the first weld metal part 40 becomes excessively high, and joining strength between the first steel sheet 10 and the second steel sheet 20 is reduced, as will be described later. For this reason, the tensile strength of the second steel sheet 20 is set to 2.5 GPa or less.

Figure 3:
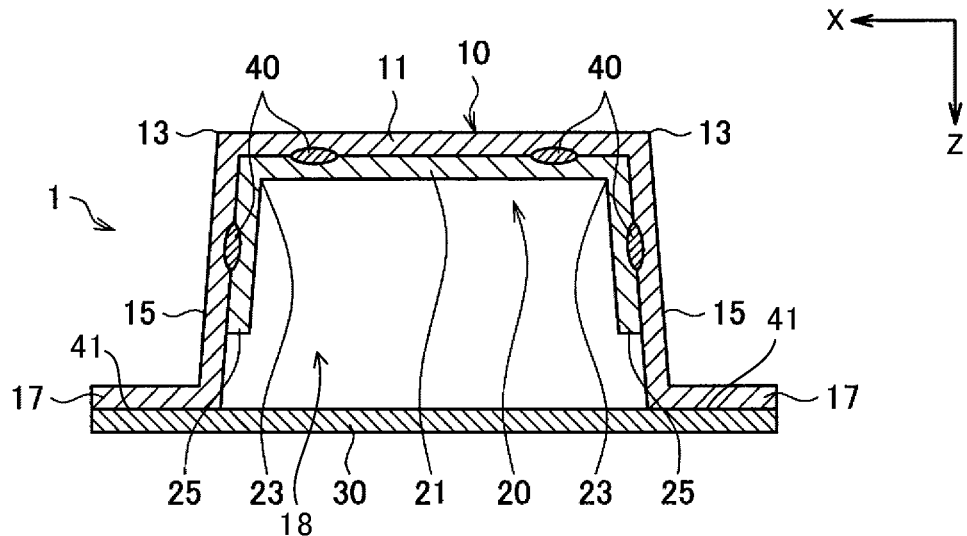
FIG. 3 is a sectional view of X-Z plane illustrating one example of the automotive framework member according to the same embodiment.

Next, a cross sectional shape of X-Z plane of the framework member 1 formed to have a closed cross section, will be described while referring to FIG. 3. FIG. 3 is a sectional view of X-Z plane illustrating one example of the framework member 1 according to the present embodiment, and is a sectional view taken along I-I' in FIG. 1. However, as illustrated in FIG. 3, the framework member 1 according to the present embodiment is formed to have a closed cross section in a manner that the flange parts 17 of the first steel sheet 10 are welded to a plate-shaped member 30 as a third steel sheet. To the inner side of the closed cross section of the framework member 1, the second steel sheet 20 is provided. The second steel sheet 20 is welded to the first steel sheet 10 via the first weld metal parts 40. Interfaces between the plate-shaped member 30 (the third steel sheet) and the flange parts 17 are joined by second weld metal parts 41.

In the present embodiment, the first weld metal part 40 is formed at an interface between the first top wall part 11 of the first steel sheet 10 and the second top wall part 21 of the second steel sheet 20. Further, the first weld metal part 40 is formed at an interface between the first vertical wall part 15 of the first steel sheet 10 and the second vertical wall part 25 of the second steel sheet 20. Note that the first weld metal part 40 may be formed at, at least either the interface between the first top wall part 11 and the second top wall part 21 or the interface between the first vertical wall part 15 and the second vertical wall part 25.

The first weld metal part 40 may be formed at a plurality of places along the interface between the first top wall part 11 and the second top wall part 21 or the interface between the first vertical wall part 15 and the second vertical wall part 25 in the X-Z plane. Further, the first weld metal part 40 may be formed at a plurality of places along the longitudinal direction of the framework member 1 (the Y direction in FIG. 1), as illustrated in FIG. 1. Further, the first weld metal part 40 may be provided in not only a dot shape but also a C-shape, a U-shape, an elliptical shape, a line shape having a predetermined length, or a zigzag shape.

Note that when the framework member 1 is formed to have the closed cross section, the second weld metal parts 41 can be provided at arbitrary positions at the interfaces between the flange parts 17 and the plate-shaped member 30, and the second weld metal part 41 may be provided in a dot shape, a C-shape, a U-shape, an elliptical shape, a line shape having a predetermined length, a zigzag shape, or the like.

The first weld metal part 40 and the second weld metal part 41 can be formed by employing various joining techniques being publicly-known techniques. As one example of a method of forming the first weld metal part 40 and the second weld metal part 41, there can be cited spot welding, laser welding, and use of the spot welding and the laser welding in a combined manner.

Figure 4:
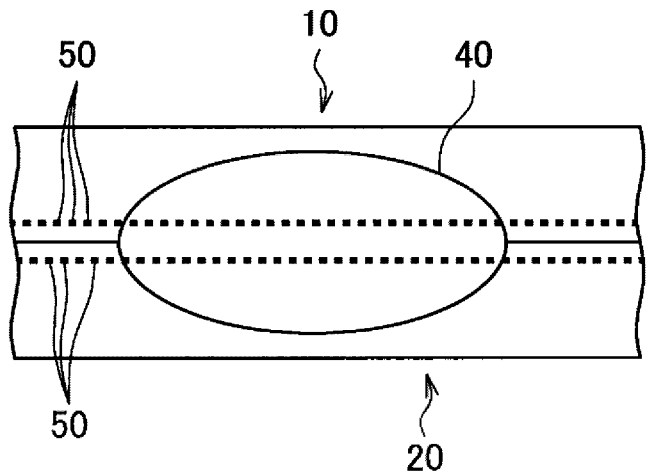
FIG. 4 is an enlarged view illustrating one example of a weld according to the same embodiment.

Next, the first weld metal part 40 and a heat affected zone in a periphery thereof according to the present embodiment will be described while referring to FIG. 4, FIG. 5A, and FIG. 5B. FIG. 4 is an enlarged view illustrating one example of the first weld metal part 40 according to the present embodiment. As illustrated in FIG. 4, the first weld metal part 40 is a part formed in a manner that a base metal of the first steel sheet 10 and a base metal of the second steel sheet 20 are mutually melted to be solidified at an interface at which the first steel sheet 10 and the second steel sheet 20 are overlapped with each other. Specifically, the first steel sheet 10 and the second steel sheet 20 are welded, by the first weld metal part 40, at an interface where they are overlapped with each other.

Here, conventionally, in a peripheral region of a region where base metals are mutually melted to be solidified by welding (so-called nugget part), a characteristic and a structure thereof are known to change to be different from those of the base metals, due to heat input when performing the welding. The peripheral region is referred to as HAZ (Heat Affected Zone). When a member being a welding object is a steel sheet containing a martensite structure, temper softening partially occurs due to an increase in temperature in accordance with the heat input at this heat affected zone. As a result of this, hardness at the heat affected zone sometimes becomes lower than that of the base metal. Such a decrease in hardness at the heat affected zone becomes a starting point of fracture when a load is applied to the welded member, which may greatly exert influence on the strength of the whole member.

The present inventors found out that when members to be welding objects are high-tensile steel sheets having different tensile strengths in particular, an influence of hardness difference at a heat affected zone becomes large due to a difference in strengths. Specifically, in a steel sheet with relatively high strength, since hardness of its original base metal is sufficiently high, a hardness reduction at the heat affected zone tends to be increased. On the other hand, in a steel sheet with low strength, the hardness reduction at the heat affected zone is suppressed more, when compared to a steel sheet with high strength. Therefore, when members having mutually different strengths are welded to each other, a hardness reduction at the heat affected zone on the side of the steel sheet with higher strength becomes relatively significant. Besides, when members with different strengths are welded to each other for the purpose of reinforcing the members, there can be supposed a case where the members are used under a condition where a larger load is applied, in expectation of an amount of the reinforcement. In such a case, the hardness reduction at the heat affected zone may exert a larger influence on the strength of the whole member.

A change in hardness at an actual weld will be described while referring to FIG. 5A. FIG. 5A is a graph illustrating one example of a change in hardness of a weld and a periphery thereof according to a conventional example. A hardness measurement condition of the weld is as follows.

A cross section perpendicular to a sheet surface of a sample including the vicinity of a first weld metal part of a framework member is collected, a measuring plane of the sample is prepared, and subjected to a hardness test. A method of preparing the measuring plane is carried out according to JIS Z 2244. A silicon carbide paper of #600 to #1500 is used to polish the measuring plane, and after that, by using a liquid obtained by dispersing a diamond powder with granularly of 1 μm to 6 μm in a diluted solution of alcohol or the like or pure water, the measuring plane is mirror finished, and the measuring plane is corroded by picral, to thereby make a nugget to be appeared. The hardness test is carried out by a method described in JIS Z 2244. On the sample whose measuring plane is prepared, measurement of hardness is performed by using a Vickers hardness testing machine. At positions of 0.2 mm from an overlapped surface between the first steel sheet 10 and the second steel sheet 20 in a sample cross section, hardness is measured at a load of 1 kgf and a measurement pitch of 0.25 mm, from the whole region of the first weld metal part to the base metal side. Continuous dots 50 in FIG. 4 schematically illustrate measurement places.

Figure 5A:
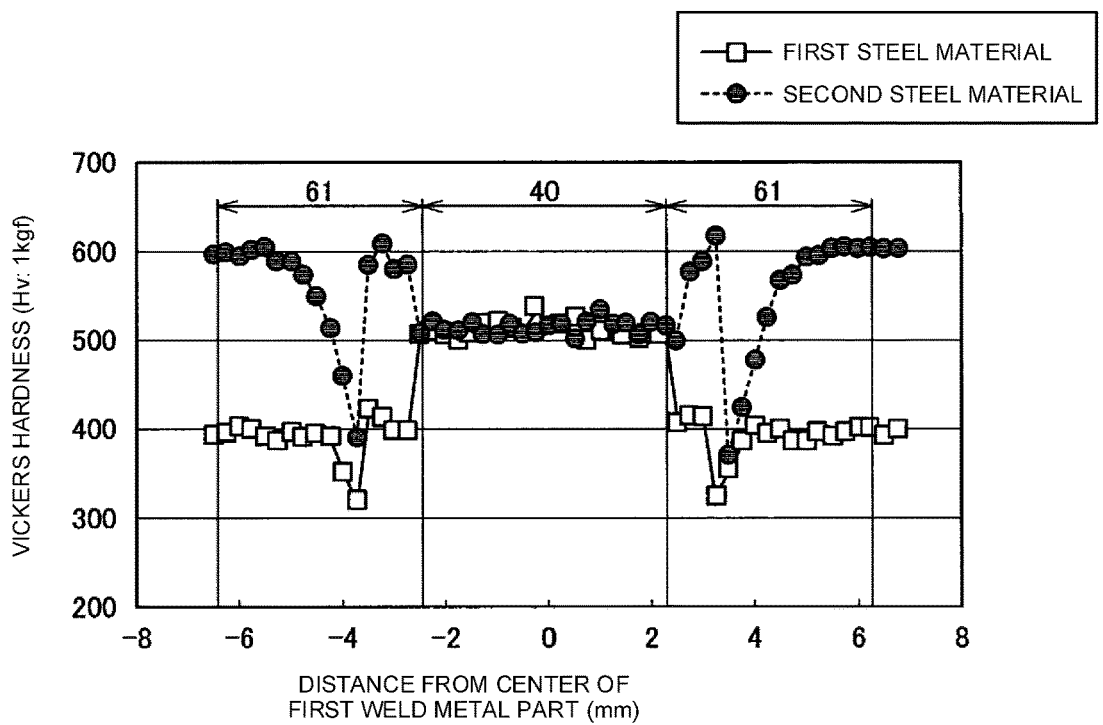
FIG. 5A is a graph illustrating a change in hardness of a weld according to a conventional example.

The hardness at each measurement point is plotted according to a distance when a center position of the first weld metal part 40 (corresponding to the nugget) is set to an origin, which is illustrated in a graph of FIG. 5A.

As illustrated in FIG. 5A, the hardness of the first weld metal part 40 has an approximately mean value of the hardness of the first steel sheet 10 and the hardness of the second steel sheet 20, and is about 500 Hv, for example. Further, the hardness on the base metal side of the first steel sheet 10 is about 400 Hv, for example. Further, the hardness on the base metal side of the second steel sheet 20 is about 600 Hv, for example.

Here, the hardness on the base metal side is represented by a mean value of hardness values in a region where there is no change in characteristic due to heat affect from the first weld metal part 40 defined by welding conditions (a position which is sufficiently separated from the first weld metal part 40). The hardness on the base metal side has a value which is nearly equal to that of the hardness possessed by each member before welding. Further, the hardness of the first weld metal part indicates a mean value of hardness values in the first weld metal part 40 (the nugget).

As illustrated in FIG. 5A, in each of the first steel sheet 10 and the second steel sheet 20, the hardness is partially reduced in a heat affected zone 61 that exists in the periphery of the first weld metal part 40, as described above. A range of the heat affected zone 61 is within a range from an end portion of the first weld metal part 40 to an outside of the end portion by 4 mm.

Here, the portion where the hardness is partially reduced, is a portion indicating a peak due to the hardness reduction in the measurement results of the change in hardness, and indicates a significant hardness reduction excluding a change such as a measurement error. Concretely a hardness reduction of 25 Hv or more in terms of an absolute value, for example, is indicated.

The hardness in the heat affected zone 61 of the first steel sheet is greatly reduced in a partial manner relative to the hardness of the base metal of the first steel sheet 10 (at positions of X=about 3 mm to 4 mm, and X=about −4 mm to −3.5 mm). An absolute value of the hardness difference is about 80 Hv at maximum.

The hardness in the heat affected zone 61 of the second steel sheet 20 is greatly reduced in a partial manner relative to the hardness of the base metal of the second steel sheet 20

(X=about 3 mm to 5 mm, X=about −5.5 mm to −3.5 mm). An absolute value of the hardness difference is about 200 Hv at maximum.

These hardness reductions in the first steel sheet 10 and the second steel sheet 20 may exert a large influence on the strength of the whole member. In particular, the hardness reduction in the second steel sheet 20 may exert a large influence on the strength of the whole member.

Accordingly, as a result of earnest studies, the present inventors came up with an idea to suppress the hardness reduction in the periphery of the first weld metal part 40, In particular, the present inventors conducted predetermined processing to be described later for reducing the influence due to the heat input in the first weld metal part 40, to thereby control the hardness of the peripheral region of the first weld metal part 40 according to the present embodiment.

Hereinafter, a change in hardness of the weld (the first weld metal part 40 and the periphery thereof) according to the present embodiment, will be described while referring to FIG. 5B. FIG. 5B is a graph illustrating one example of a change in hardness of the first weld metal part 40 and the periphery thereof according to the present embodiment. Conditions of hardness measurement are similar to those in the case of FIG. 5A.

Figure 5B:
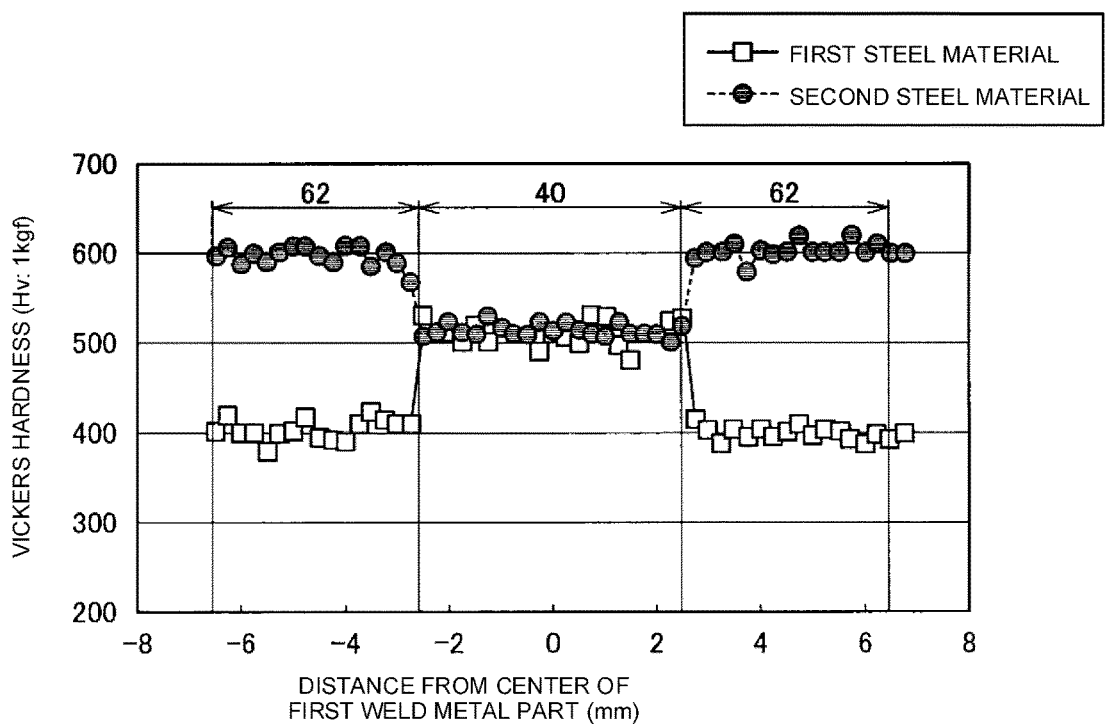
FIG. 5B is a graph illustrating one example of a change in hardness of the weld according to the same embodiment.

As illustrated in FIG. 5B, the hardness of the first weld metal part 40, the hardness on the base metal side of the first steel sheet 10, and the hardness on the base metal side of the second steel sheet 20 are about the same as those in the case of FIG. 5A.

Here, as described above, in the periphery of the first weld metal part 40 according to the present embodiment, the processing of reducing the influence such as the hardness reduction due to the heat input during welding is performed. As a result of this, in the periphery of the first weld metal part 40, a peripheral region 62 corresponding to the heat affected zone 61, exists in place of the conventional heat affected zone 61. A range of the peripheral region 62 is set to a range from an end portion of the first weld metal part 40 to an outside of the end portion by 4 mm, along a peripheral edge of the first weld metal part 40.

The end portion of the first weld metal part 40 indicates a boundary line of the first weld metal part 40 capable of being visually recognized by corrosion treatment in the hardness measurement conditions of the first weld metal part 40 described above. Concretely, when a welding method is spot welding, the end portion corresponds to a boundary between the first weld metal part 40 and the base metal. Further, when the welding method is laser welding, the end portion corresponds to a boundary of an end portion in a width direction of the first weld metal part 40.

As illustrated in FIG. 5B, the hardness in the peripheral region 62 of the first steel sheet 10 according to the present embodiment is not greatly reduced in a partial manner, relative to the hardness of the base metal of the first steel sheet 10. In other words, a lower limit value of the hardness in the peripheral region 62 of the first steel sheet 10 according to the present embodiment is equal to or more than the hardness of the base metal of the first steel sheet 10.

Further, as illustrated in FIG. 5B, the hardness in the peripheral region 62 of the second steel sheet 20 according to the present embodiment is not greatly reduced in a partial manner, relative to the hardness of the base metal of the second steel sheet 20. Specifically, the hardness in the peripheral region 62 of the second steel sheet 20 is about 600 Hv, which is nearly equal to the hardness of the base metal of the second steel sheet 20. Concretely, as illustrated in FIG. 5B, a hardness difference between a lower limit value of the hardness in the peripheral region 62 of the second steel sheet 20 according to the present embodiment and the hardness of the base metal of the second steel sheet 20 falls within 100 Hv or less in terms of an absolute value.

Besides, in order to grasp the relation between the lower limit value of the hardness of the peripheral region 62 of the second steel sheet 20 and the hardness of the base metal of the second steel sheet 20, examination was made regarding an influence of a ratio between the lower limit value of the hardness of the peripheral region 62 and the hardness of the base metal of the second steel sheet 20, exerted on occurrence of fracture in the peripheral region 62.

Experimental conditions for the examination are as follows. A second test piece formed of a steel sheet having a size of 1.3 t×25 mm×25 mm with tensile strength of 1.8 GPa, was overlapped with a center portion of a first test piece formed of a steel sheet having a size of 1.6 t×25 mm×200 mm with tensile strength of 1.3 GPa and spot welding was performed, to thereby produce a plurality of tensile test pieces. On each of the test pieces after being subjected to the spot welding, heat treatment was performed while appropriately changing conditions, to thereby produce test pieces in each of which a lower limit value of hardness in the peripheral region 62/hardness of base metal (%) was different. Regarding these test pieces, a tensile test was performed at a rate of 10 mm/min, and after a fracture occurred, a fracture surface was observed, and a state of the fracture was evaluated. Results are summarized in Table 1 below.

TABLE 1

| LOWER LIMIT VALUE OF HARDNESS IN PERIPHERAL REGION 62/ HARDNESS OF BASE METAL (%) | FRACTURE IN PERIPHERAL REGION 62 WHEN COLLISION OCCURS |
| --- | --- |
| 65 | NG: OCCURRED |
| 75 | NG: OCCURRED |
| 80 | OK: NOT OCCURRED |
| 85 | OK: NOT OCCURRED |
| 90 | OK: NOT OCCURRED |
| 100 | OK: NOT OCCURRED |

As shown in Table 1, in the case where the lower limit value of the hardness (the minimum Vickers hardness) in the peripheral region 62 of the second steel sheet 20 became a value smaller than 80% of the hardness of the base metal of the second steel sheet 20, when an impact load was applied to the framework member 1, the fracture occurred in the peripheral region 62. On the other hand, in the case where the lower limit value of the hardness in the peripheral region 62 of the second steel sheet 20 was 80% or more of the hardness of the second steel sheet 20, even when the impact load was applied to the framework member 1, the fracture did not occur in the peripheral region 62.

Therefore, it was found out that when the lower limit value of the hardness (the minimum Vickers hardness) in the peripheral region 62 of the second steel sheet 20 according to the present embodiment is set to 80% or more of the hardness of the base metal of the second steel sheet 20, the strength is improved as a whole framework member 1. In particular, the lower limit value of the hardness (the minimum Vickers hardness) in the peripheral region 62 of the second steel sheet 20 may also be set to 90% or more of the hardness of the base metal of the second steel sheet 20. The above is the explanation regarding the influence of the ratio between the lower limit value of the hardness of the peripheral region 62 and the hardness of the second steel sheet 20, exerted on the occurrence of fracture in the peripheral region 62.

Figure 7:
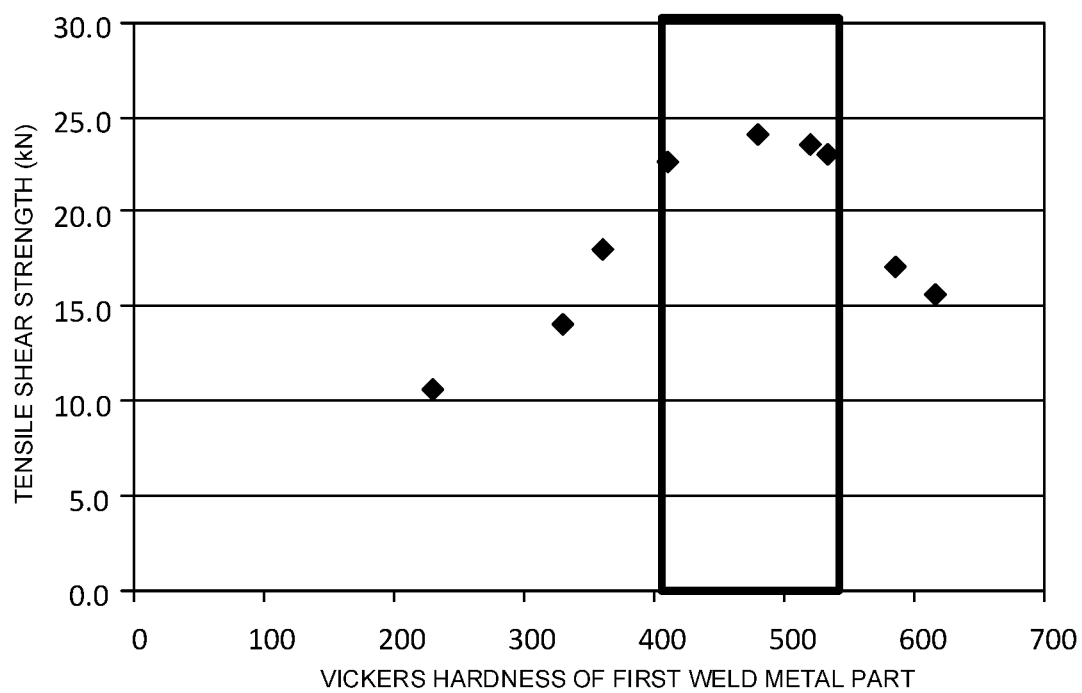
FIG. 7 is a graph illustrating results of the test for measuring the tensile shear strength of the first weld metal part.

The control of the hardness of the heat affected zone 61 between the first weld metal part 40 and the base metal first weld metal part 40 (a nugget diameter) was 6.3 mm. Subsequently the first steel sheet 10 and the second steel sheet 20 were pulled from each other, and tensile shear strength (kN) was measured. Results are shown in Table 2 and FIG. 7.

TABLE 2

| MARK | FIRST STEEL SHEET (MPa) | SECOND STEEL SHEET (MPa) | VICKERS HARDNESS OF FIRST WELD METAL PART | TENSILE SHEAR STRENGTH (kN) | REMARKS |
| --- | --- | --- | --- | --- | --- |
| A | 350 | 350 | 230 | 10.5 | COMPARISON |
| B | 445 | 445 | 330 | 14.0 | COMPARISON |
| C | 430 | 1830 | 360 | 18.0 | COMPARISON |
| D | 1010 | 1820 | 410 | 22.5 | PRESENT INVENTION |
| E | 1340 | 1820 | 480 | 24.0 | PRESENT INVENTION |
| F | 1480 | 1820 | 520 | 23.5 | PRESENT INVENTION |
| G | 1210 | 2010 | 534 | 23.0 | PRESENT INVENTION |
| H | 1800 | 1820 | 586 | 17.0 | COMPARISON |
| I | 2010 | 2010 | 615 | 15.5 | COMPARISON | according to the present embodiment, namely, the peripheral region 62, is performed by employing various techniques of surface treatment, surface working, or heat treatment being publicly-known techniques. As one example of a method of hardness control, there can be cited hardness control through a hot stamping method after welding, which will be described later.

[Hardness of First Weld Metal Part]

Further, in addition to the control of the lower limit value of hardness (the minimum Vickers hardness) in the peripheral region 62 of the second steel sheet 20, it is also important to set the Vickers hardness of the first weld metal part 40 to fall within a predetermined range. Specifically, in the first weld metal part 40, the first steel sheet 10 and the second steel sheet 20 are melted to be solidified, so that it can be estimated that the hardness of the first weld metal part 40 indicates an approximately mean value of the hardness of the first steel sheet 10 and the hardness of the second steel sheet 20.

As described above, the higher the tensile strength of the second steel sheet 20 to be used as the reinforcing member is, the more effective it is in order to improve the strength of the whole framework member 1. However, since the hardness of the first weld metal part 40 indicates the approximately mean value of the hardness of the first steel sheet 10 and the hardness of the second steel sheet 20, a relation in created such that when the tensile strength of the second steel sheet 20 becomes high, the hardness of the first weld metal part 40 also becomes high in proportion thereto. As a result of this, there is a concern that the hardness of the first weld metal part 40 becomes excessively high to deteriorate the toughness, and when an external force is applied to the framework member 1, a fracture of the first weld metal part 40 occurs.

Accordingly, in the present disclosure, when the tensile strength of the second steel sheet 20 is set to 2.5 GPa or less, the deterioration of toughness due to excessively high hardness of the first weld metal part 40 is avoided.

Figure 6:
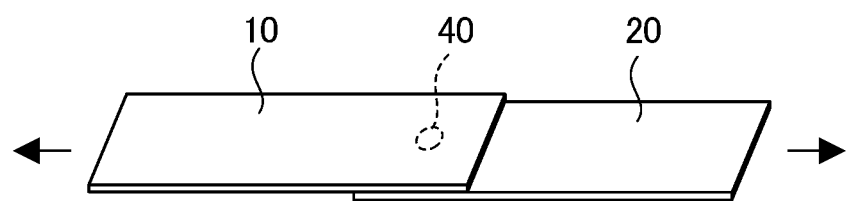
FIG. 6 is an explanatory view of a test for measuring tensile shear strength of a first weld metal part.

As illustrated in FIG. 6, the first steel sheet 10 in a flat sheet shape and the second steel sheet 20 in a flat sheet shape were joined b the first weld metal part 40. A diameter of the As an index of the deterioration of toughness in the first weld metal part 40, the tensile shear strength of 20.0 kN was set as an acceptance line. In marks D, E, F, G in each of which the hardness of the first weld metal part 40 was within a range of 400 to 540, the tensile shear stress became 20.0 kN or more, and thus satisfied the acceptance line. On the other hand, in marks A, B, C in each of which the hardness of the first weld metal part 40 was less than 400, and in marks H, I in each of which the hardness of the first weld metal part 40 exceeded 540, the tensile shear stress became less than 20.0 kN.

Operations and Effects

According to the present embodiment, the first steel sheet 10 formed of the steel sheet with relatively low strength and the second steel sheet 20 formed of the steel sheet with relatively high strength are welded to improve the strength as the framework member 1, and besides, the hardness reduction in the first weld metal part 40 is avoided, so that the reinforcing effect obtained by the steel sheet with high strength can be sufficiently exhibited. Further, in the present embodiment, the change in hardness in the region from the end portion of the first weld metal part 40 to the outside of the end portion by 4 mm, instead of the conventional heat affected zone, is controlled. As a result of this, a strength reduction region of the heat affected zone is not generated in the periphery of the first weld metal part 40, so that the fracture of the member starting from the strength reduction region does not occur when a collision occurs, and thus the strength improving effect obtained by the welding of the first steel sheet 10 and the second steel sheet 20 can be maximized.

According to the present embodiment, the part that forms the outer shape of the framework member L1 is formed of the first steel sheet 10 with relatively low strength. As a result of this, when an impact load is input in the framework member 1, the framework member 1 does not fracture but is greatly deformed, so that an impact energy absorption can be increased.

According to the present embodiment, since the tensile strength of the second steel sheet 20 is set to 2.5 GPa or less, the hardness of the first weld metal part 40 falls within the range of 400 to 540, resulting in that the toughness is improved. For this reason, the joining strength between the first steel sheet 10 and the second steel sheet 20 is increased, and even in a case where the impact load is input in the framework member 1, it is possible to maintain the joining state between the first steel sheet 10 and the second steel sheet 20. Consequently, since the framework member 1 can be greatly deformed without being fractured, it is possible to further increase the impact energy absorption.

Modified Example

Figure 8:
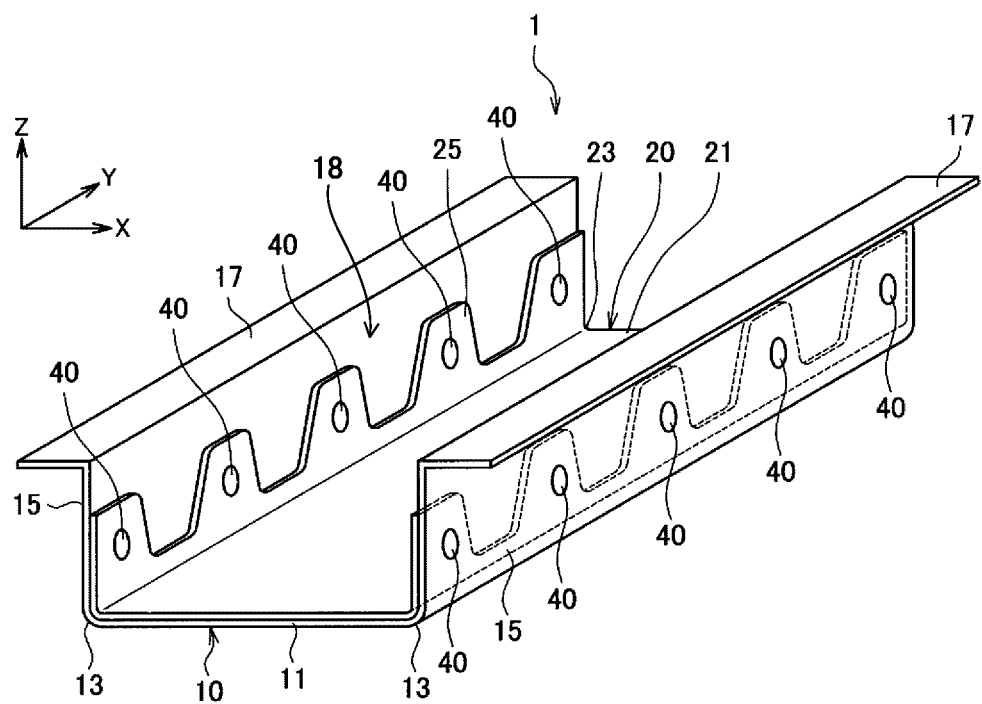
FIG. 8 is a perspective view illustrating another example of the automotive framework member according to the same embodiment.

Next, a modified example of the framework member 1 according to the present embodiment will be described while referring to FIG. 8. FIG. 8 is a perspective view illustrating another example of the framework member 1 according to the present embodiment. The present modified example is different from the above-described embodiment in a shape of an edge of the second vertical wall part 25 of the second steel sheet 20. Note that the configuration other than the above of the present modified example is common to that of the above-described embodiment, so that explanation thereof will be omitted.

As illustrated in FIG. 8, in the present modified example, the first steel sheet 10 has a substantially hat shape in the cross-sectional view of X-Z plane in FIG. 6. The second steel sheet 20 has a rectangular shape whose one side is opened, in the cross-sectional view of X-Z plane. The second steel sheet 20 is attached to an inner wall surface of the first steel sheet 10.

The second steel sheet 20 has a corrugated shape in which the edge of the second vertical wall part 25 has peaks and troughs repeatedly in an alternate manner along the longitudinal direction (the Y direction) of the framework member 1. Specifically, in the second steel sheet 20, a length in a direction in which the second vertical wall part 25 extends (the Z direction) periodically changes. On the peaks of the second vertical wall part 25, the first weld metal parts 40 are formed, and the first steel sheet 10 and the second steel sheet 20 are welded via the first weld metal parts 40.

In the present modified example, since the edge of the second vertical wall part 25 of the second steel sheet 20 has the peaks and the troughs, it is possible to realize reduction in weight by the amount of the troughs. Further, since the first weld metal parts 40 are formed on the peaks of the second vertical wall part 25 of the second steel sheet 20, transmission of stress from the longitudinal direction is cut by the troughs, resulting in that a stress concentration on the first weld metal parts 40 is reduced. The above is the explanation regarding the modified example of the framework member 1 according to the present embodiment.

[Hot Stamping Method]

Figure 9:
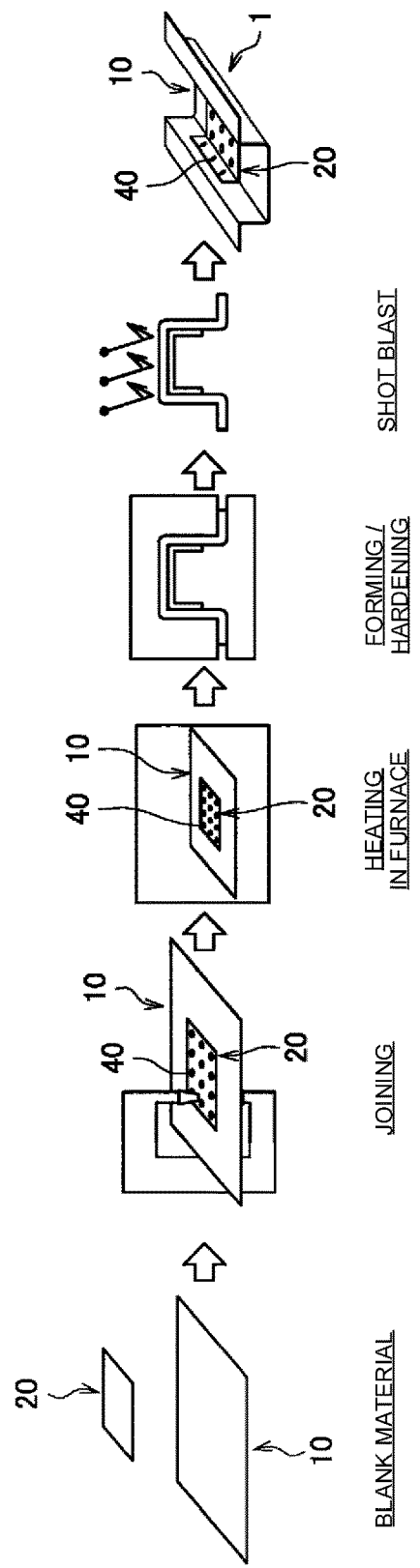
FIG. 9 is a view illustrating one example of a manufacturing method of the automotive framework member according to the same embodiment.

Next, one example of a manufacturing method of the framework member 1 according to the present embodiment will be described while referring to FIG. 9. FIG. 9 is a view illustrating one example of the manufacturing method of the framework member according to the present embodiment. As illustrated in FIG. 9, the first steel sheet 10 and the second steel sheet 20 are first prepared as a blank material (flat sheet members). Subsequently the first steel sheet 10 and the second steel sheet 20 are welded to each other via the first weld metal parts 40. The blank material formed of the first steel sheet 10 and the second steel sheet 20 which are integrated via the first weld metal parts 40, is heated to an austenite region of about 900° C. in a heating furnace. After that, the blank material is formed into a predetermined shape and subjected to hardening through the hot stamping method, to thereby form the framework member 1. At this time, by the heating and hardening process, the hardness of the heat affected zone of the first weld metal part 40 is controlled to fall within the predetermined range. Subsequently, shot blast is performed, to thereby remove scale on a surface of the steel sheet. Note that when the steel sheet is subjected to plating of aluminum-based plating, zinc-based plating, or the like, the shot blast process is not required.

Generally it is often the case that a steel sheet whose tensile strength after hardening is 1.6 GPa or less is not employed as a steel sheet for hot press material (a steel sheet used for a hot stamping method). This is because, in a region in which the tensile strength is 1.6 GPa or less, a method of performing cold pressing on a cold-rolled high strength steel sheet is economically advantageous. When the steel sheet for hot press material has tensile strength of 1.5 GPa or less, and further, when it has tensile strength of 1.35 GPa or less, such a steel sheet is further unlikely to be employed.

In order to partially increase rigidity of a framework member of an automobile or the like, at a place of increasing the rigidity, a second steel sheet is overlapped with a first steel sheet. At this time, if hardened (hot-pressed) steel sheets are mutually overlapped to be welded, a periphery of a weld metal part is softened. Specifically, a HAZ softened region appears in the periphery of the weld metal part. If there is the HAZ softened region, when a load is applied to the framework member of the automobile or the like, the framework member is likely to be broken from the HAZ softened region. In order to avoid this, in the present disclosure, a steel sheet for hot pressing formed by previously overlapping the first steel sheet 10 and the second steel sheet 20 and welding them, is prepared beforehand, and subjected to hot pressing (hot stamping). This makes it possible to eliminate the HAZ softened region generated during the welding, by hardening which is performed during the hot pressing (hot stamping).

However, even if the HAZ softened region is eliminated, when the hardness of the first weld metal part 40 is excessively high after the hardening, the first weld metal part 40 is likely to be fractured to break the framework member 1 when a load is applied to the framework member 1 of the automobile or the like. In order to avoid this, in the present disclosure, the tensile strength of the first steel sheet 10 is set to relatively low strength, and the upper limit is set to the tensile strength of the second steel sheet 20, so that the hardness of the first weld metal part 40 does not become excessively high even after the hardening. In a combination where the tensile strength of the first steel sheet 10 after being hardened (after being hot-stamped) is 1.0 GPa to 1.6 GPa, and the tensile strength of the second steel sheet 20 after being hardened (after being hot-stamped) is 1.8 GPa to 2.6 GPa, it is possible to prevent the hardness of the first weld metal part 40 from being excessively high, Specifically, if a steel sheet having tensile strength of 1.6 GPa or less, which is usually not used for hot stamping, is used for the first weld metal part 40, it is possible to prevent the hardness of the first weld metal part 40 from being excessively high. A higher effect is exhibited if the tensile strength is 1.5 GPa or less, and further, if it is 1.35 GPa or less.

Note that the hardness of the first weld metal part 40 after being hardened (after being hot-stamped) is desirably 400 to 540 Hv in terms of Vickers hardness.

[Relation with Third Steel Sheet]

The framework member 1 of the present disclosure may be formed to have a closed cross section, as described before in FIG. 3. When the framework member 1 is made to have a closed cross section, the plate-shaped member 30 as the third steel sheet is welded to the flange parts 17 of the first steel sheet 10. For this reason, there exist the second weld metal parts 41 at interfaces between the flange parts 17 of the first steel sheet 10 and the plate-shaped member 30.

Normally, the welding between the flange parts 17 of the first steel sheet 10 and the plate-shaped member 30 is performed after the hot pressing (hot stamping). For this reason, in the flange parts 17 of the first steel sheet 10 and the plate-shaped member 30, the HAZ (heat affected zone) appears in the vicinity of the second weld metal part 41.

However, as indicated before in FIG. 5A as well, the tensile strength of the first steel sheet 10 has a relatively low value of 1.0 GPa to 1.6 GPa, so that in the first steel sheet 10, it is possible to reduce the influence of strength reduction caused by the HAZ. Further, in a similar manner, by setting the tensile strength of the plate-shaped member 30 as the third steel sheet to have a relatively low value of 0.45 to 1.6 GPa, also in the plate-shaped member 30, it is possible to reduce the influence of strength reduction caused by the HAZ. The tensile strength of the plate-shaped member 30 is more preferably 0.6 to 1.35 GPa, and most preferably 0.6 to 1.25 GPa.

Note that generally, the plate-shaped member 30 is also referred to as a closing plate. Even if the plate-shaped member 30 (closing plate) has low tensile strength, the performance (an initial load, an impact energy absorption performance) of the whole framework member 1 is unlikely to be lowered. Further, by using a steel sheet with relatively low tensile strength and low carbon content for the first steel sheet 10 and the plate-shaped member 30, the welding between the flange parts 17 of the first steel sheet 10 and the plate-shaped member 30 is favorably performed, which improves the joining strength between the both.

According to the present embodiment, the part that forms the outer shape of the framework member 1 is formed of the first steel sheet 10 with relatively low strength, and the first steel sheet 10 is welded to the plate-shaped member 30 at the flange parts 17 of the first steel sheet 10, resulting in that the framework member 1 is formed to have the closed cross section, Since the strength of the first steel sheet 10 is set to relatively low strength, it is possible to reduce the hardness reduction at the heat affected zone in the welding of the flange parts 17. As a result of this, it is possible to increase welding strength between the first steel sheet 10 and the plate-shaped member 30, Specifically, in the framework member 1, it is possible to suppress occurrence of fracture starting from the welding place between the first steel sheet 10 and the plate-shaped member 30, resulting in that the strength of the framework member 1 can be improved.

[Application Examples of Framework Member According to Embodiments of Present Disclosure]

Figure 10:
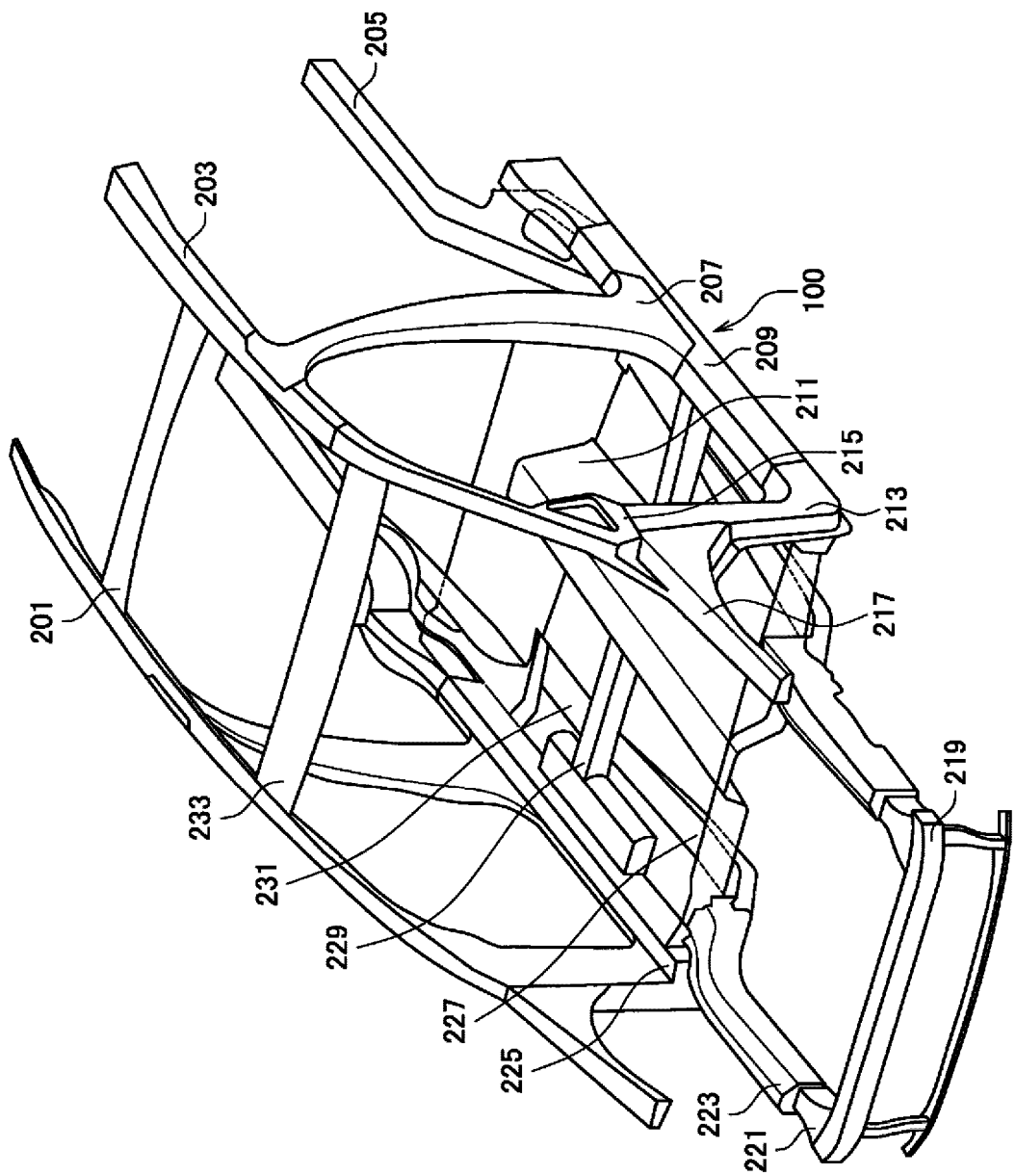
FIG. 10 is a view illustrating automotive framework components to which the automotive framework member according to the same embodiment may be applied.

The above is the detailed explanation regarding the preferred embodiments of the present disclosure. Hereinafter, application examples of the framework member according to the embodiments of the present disclosure will be described while referring to FIG. 10 to FIG. 15C. FIG. 10 is a view illustrating an automotive framework 100 as an example to which the framework member 1 according to the embodiments of the present disclosure is applied. The framework member 1 can configure the automotive framework 100 as a cabin framework or an impact absorbing framework. As application examples of the framework member 1 as the cabin framework, there can be cited a roof center reinforcement 201, a roof rail 203, a B-pillar 207, a side sill 209, a tunnel 211, an A-pillar lower 213, an A-pillar upper 215, a kick reinforcement 227, a floor cross member 229, an under reinforcement 231, a front header 233, and so on.

Further, as application examples of the framework member 1 as the impact absorbing framework, there can be cited a rear side member 205, an apron upper member 217, a bumper reinforcement 219, a crash box 221, a front side member 223, and so on.

Figure 11A:
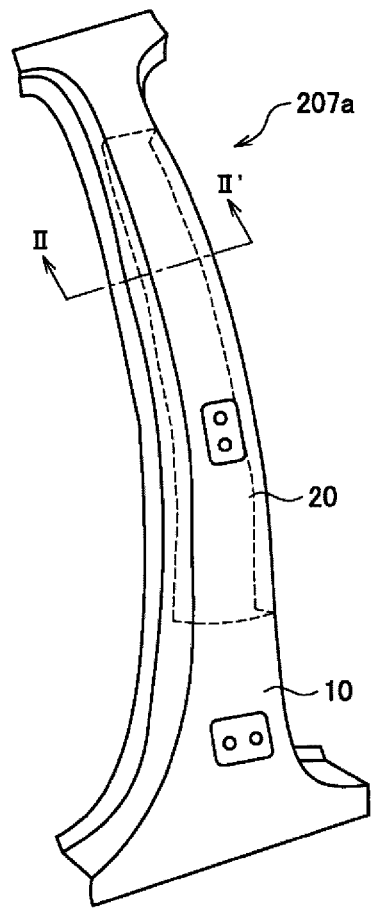
FIG. 11A is an external perspective view illustrating one example in which the automotive framework member according to the present embodiment is applied as a B-pillar.
Figure 11B:
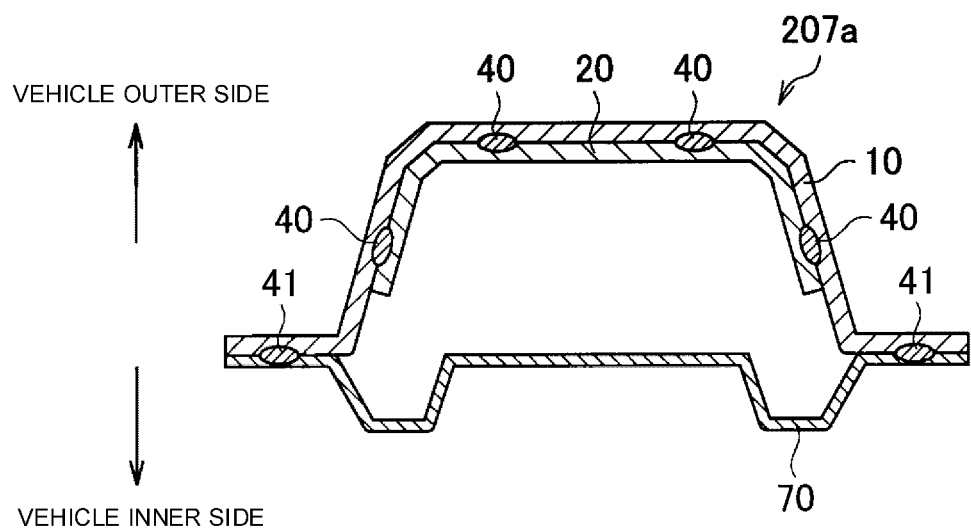
FIG. 11B is a sectional view taken along II-II' in FIG. 11A.

FIG. 11A is an external perspective view illustrating one example in which the framework member 1 according to the present embodiment is applied as a B-pillar 207a. Further, FIG. 11B is a sectional view taken along II-II' in FIG. 11A. As illustrated in FIG. 10 and FIG. 11A, the B-pillar 207a is a columnar member that joins a floor and a roof, at a position between a front seat and a rear seat, on a side surface of a vehicle. In the B-pillar 207a, the framework member 1 according to the present embodiment is used for a part that joins the floor and the roof.

As illustrated in FIG. 11B, the B-pillar 207a is formed to have a closed cross section when flange parts of the first steel sheet 10 having a substantially hat shape in a cross-sectional view are welded to a mating member 70 as the third steel sheet. To an inner side of the closed cross section of the B-pillar 207, the second steel sheet 20 in a rectangular shape whose one side is opened in a cross-sectional view, is provided. The second steel sheet 20 is welded to an inner wall surface of the first steel sheet 10 via the first weld metal parts 40. The mating member 70 has, as an example; flange parts on both ends in a cross-sectional view along a sheet width direction, and two projections adjacent to the respective flange parts and projecting outwardly of the closed cross section. Besides, in the mating member 70, a flat sheet part connects the two projections.

The B-pillar 207a is arranged so that the first steel sheet 10 side is positioned on a vehicle outer side, and the mating member 70 side is positioned on a vehicle inner side. Note that to the vehicle outer side of the B-pillar 207a, a cover member as a fourth member that covers the first steel sheet 10 from the outside, may be further provided.

Figure 12A:
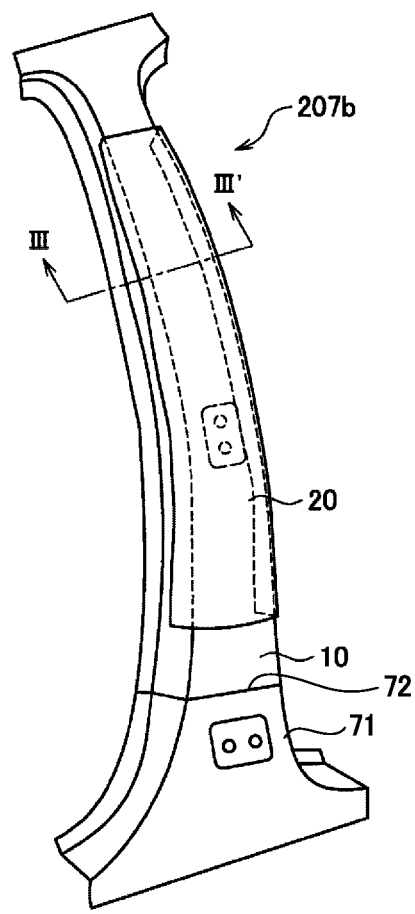
FIG. 12A is an external perspective view illustrating one example in which the automotive framework member according to the present embodiment is applied as a B-pillar.
Figure 12B:
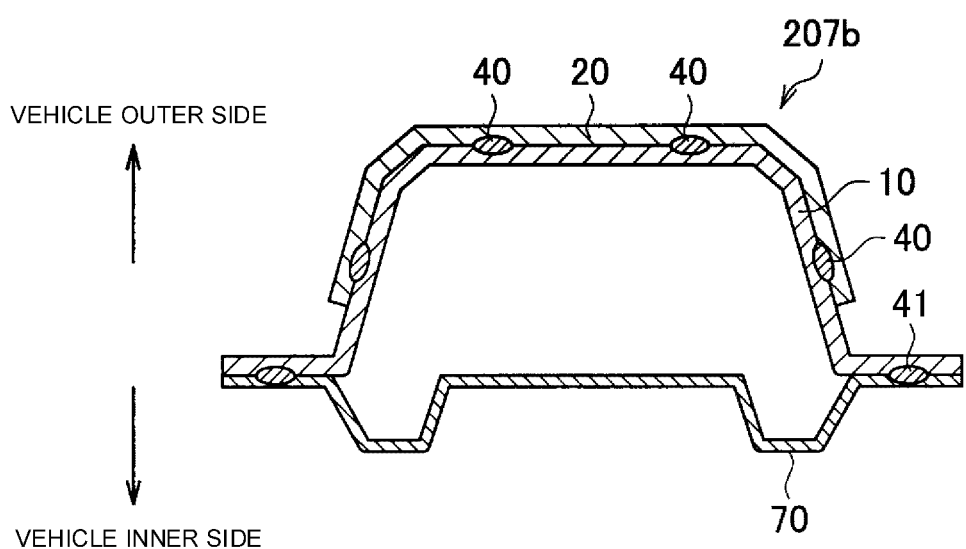
FIG. 12B is a sectional view taken along III-III' in FIG. 12A.

Next, FIG. 12A is an external perspective view illustrating another example in which the framework member 1 according to the present embodiment is applied as a B-pillar 207b. Further, FIG. 12B is a sectional view taken along III-III' in FIG. 12A. As illustrated in FIG. 12A and FIG. 12B, the B-pillar 207b is formed to have a closed cross section when flange parts of the first steel sheet 10 having a substantially hat shape in a cross-sectional view are welded to the mating member 70 as the third steel sheet. To an outer side of the closed cross section of the B-pillar 207b, the second steel sheet 20 in a rectangular shape whose one side is opened in a cross-sectional view, is provided. The second steel sheet 20 is welded to an outer wall surface of the first steel sheet 10 via the first weld metal parts 40. Note that in the embodiment illustrated in FIG. 12A, it is structured such that a lower part of the first steel sheet 10 is subjected to butt welding, which is indicated by a reference numeral 72, by laser with respect to a fourth steel sheet 71 whose tensile strength is lower than that of the first steel sheet 10. Accordingly, when a collision of side surface occurs, the fourth steel sheet 71 being the lower part of the B-pillar 207b is deformed, resulting in that the collision energy is efficiently absorbed. The first steel sheet 10 and the fourth steel sheet 71 are obtained by performing press forming on a tailored welded blank (TWB), for example. Note that the first steel sheet 10 and the fourth steel sheet may also be partially overlapped with each other to be subjected to spot welding.

The configuration other than the above is similar to that of the B-pillar 207a illustrated in FIG. 11A and FIG. 11B, so that explanation thereof will be omitted. Note that a lower part of the first steel sheet 10 of the B-pillar 207a illustrated in FIG. 11A may also be welded to a fourth steel sheet whose tensile strength is lower than that of the first steel sheet 10, similarly to FIG. 12A.

Figure 13A:
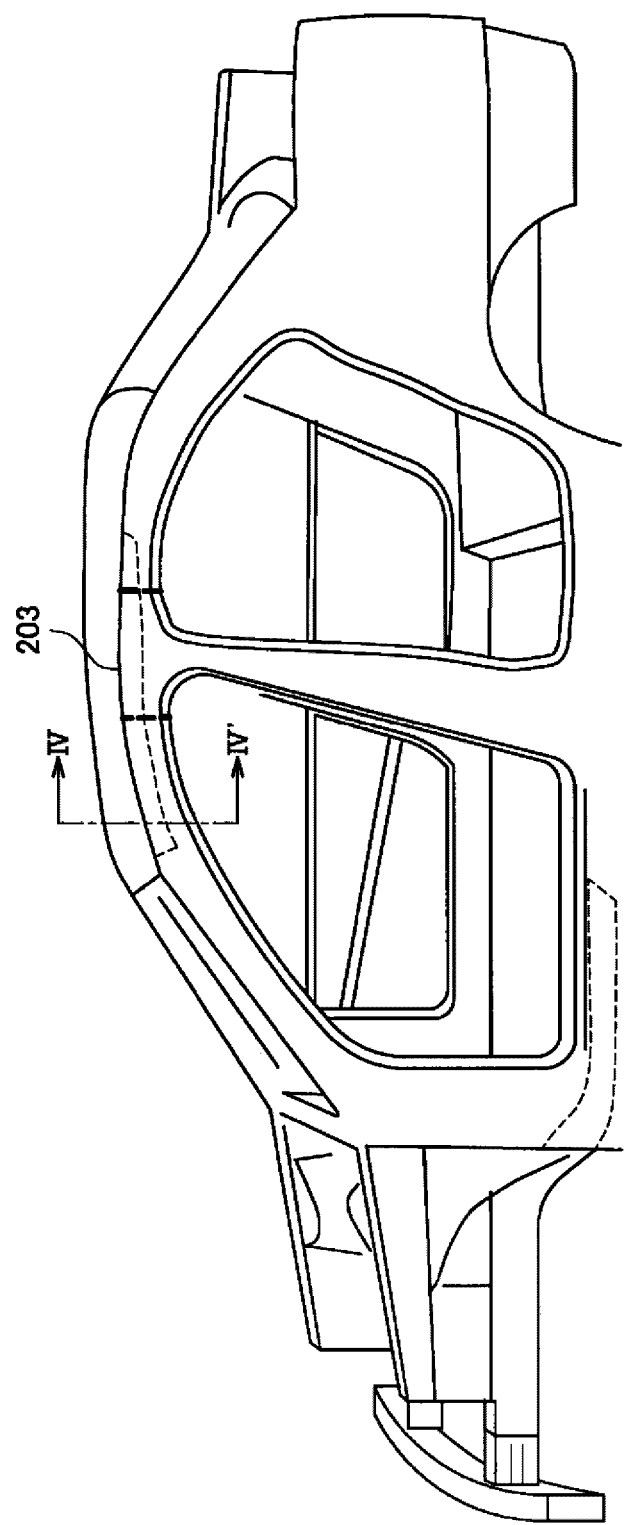
FIG. 13A is an external perspective view illustrating one example in which the automotive framework member according to the present embodiment is applied as a roof rail.
Figure 13B:
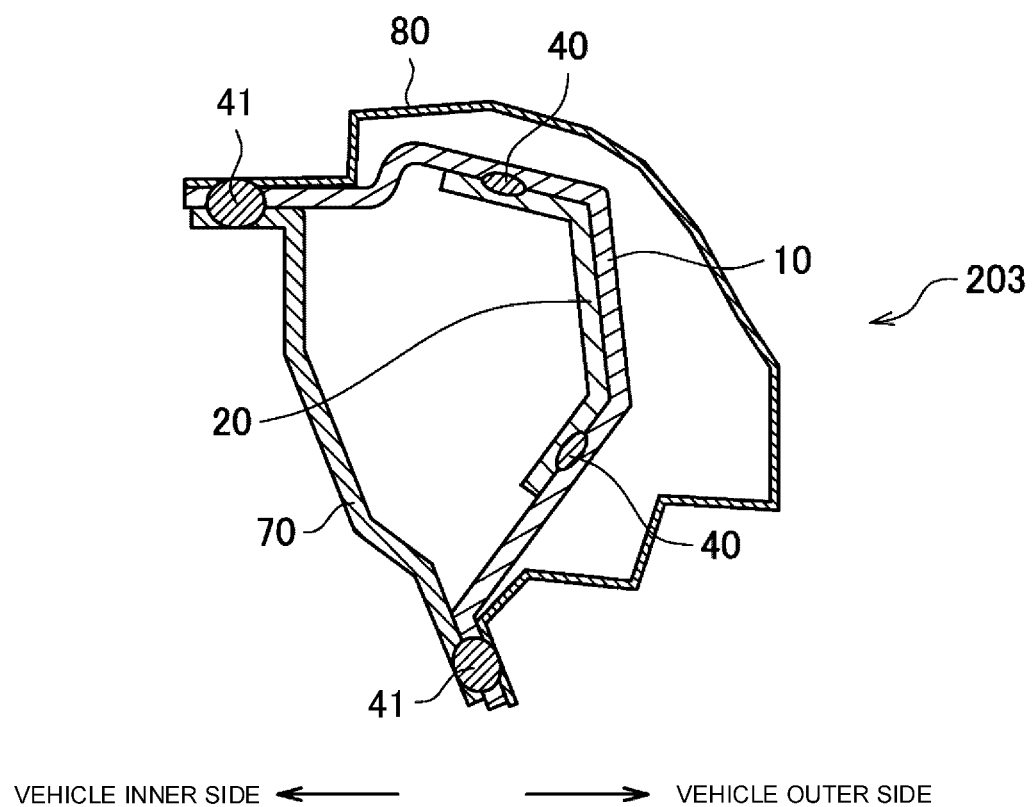
FIG. 13B is an external perspective view illustrating one example in which the automotive framework member according to the present embodiment is applied as the roof rail.

Next, FIG. 13A is an external perspective view illustrating one example in which the framework member 1 according to the present embodiment is applied as the roof rail 203. Further, FIG. 13B is a sectional view taken along IV-IV' in FIG. 13A. As illustrated in FIG. 10 and FIG. 13A, the roof rail 203 is a columnar member extending in a front-rear direction of the vehicle body and forming a side part in a vehicle body width direction of a roof. The framework member 1 according to the present embodiment is applied to the roof rail 203.

As illustrated in FIG. 13B, the roof rail 203 is formed to have a closed cross section when end portions of the first steel sheet 10 having a substantially C-shape in a cross-sectional view are welded to a mating member 70 as a third steel sheet, To an inner side of the closed cross section of the roof rail 203, the second steel sheet 20 in a rectangular shape whose one side is opened in a cross-sectional view, is provided. The second steel sheet 20 is welded to an inner wall surface of the first steel sheet 10 via the first weld metal parts 40.

The roof rail 203 is arranged so that the first steel sheet 10 side is positioned on a vehicle outer side, and the mating member 70 side is positioned on a vehicle inner side. The mating member 70 is formed in a curved shape in a manner that it is bent at a plurality of places in a sheet width direction to project outwardly of the closed cross section in a cross-sectional view along the sheet width direction, as an example. Further, flange parts are formed on the mating member 70, the flange parts being formed by bending ends in the width direction of the mating member 70. Note that to the vehicle outer side, a cover member 80 as a fourth member that covers the first steel sheet 10 from the outside, may be further provided.

Figure 14A:
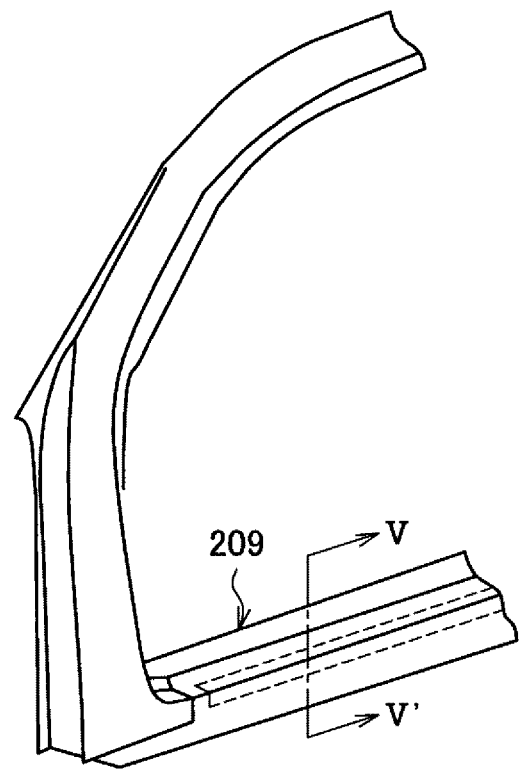
FIG. 14A is an external perspective view illustrating one example in which the automotive framework member according to the present embodiment is applied as a side sill.
Figure 14B:
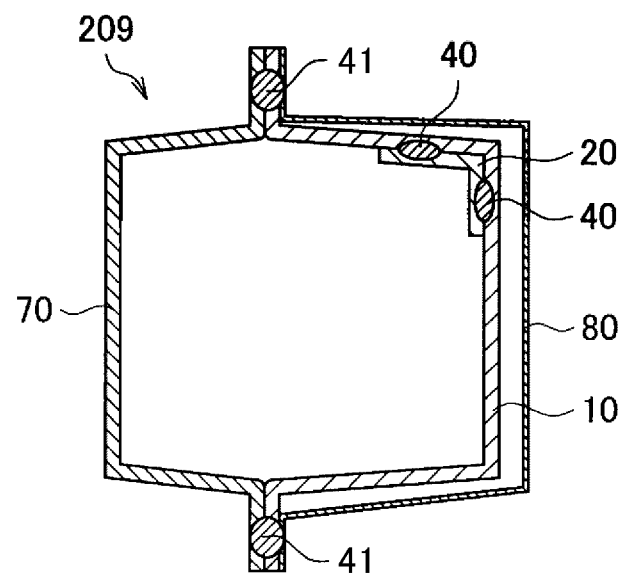
FIG. 14B is a sectional view taken along V-V' in FIG. 14A.

Next, FIG. 14A is an external perspective view illustrating one example in which the framework member 1 according to the present embodiment is applied as the side sill 209. Further, FIG. 14B is a sectional view taken along V-V' in FIG. 14A. As illustrated in FIG. 10 and FIG. 14A, the side sill 209 is a columnar member positioned at a lower part of a side surface of the vehicle body, and extending in the front-rear direction of the vehicle body. The framework member 1 according to the present embodiment is applied to the side sill 209.

As illustrated in FIG. 14B, the side sill 209 is formed to have a closed cross section when flange parts of the first steel sheet 10 having a substantially hat shape in a cross-sectional view are welded to a mating member 70 as the third steel sheet. To an inner side of the closed cross section of the side sill 209, the second steel sheet 20 formed in an L-shape in a cross-sectional view, is provided. The second steel sheet 20 is welded to an inner wall surface of a bent part of the first steel sheet 10 via the first weld metal parts 40.

The side sill 209 is arranged so that the first steel sheet 10 side is positioned on the vehicle outer side, and the mating member 70 side is positioned on the vehicle inner side. The mating member 70 is formed to have a substantially hat shape in a cross-sectional view, Note that to the vehicle outer side, a cover member 80 as a fourth member that covers the first steel sheet 10 from the outside, may be further provided.

Figure 15A:
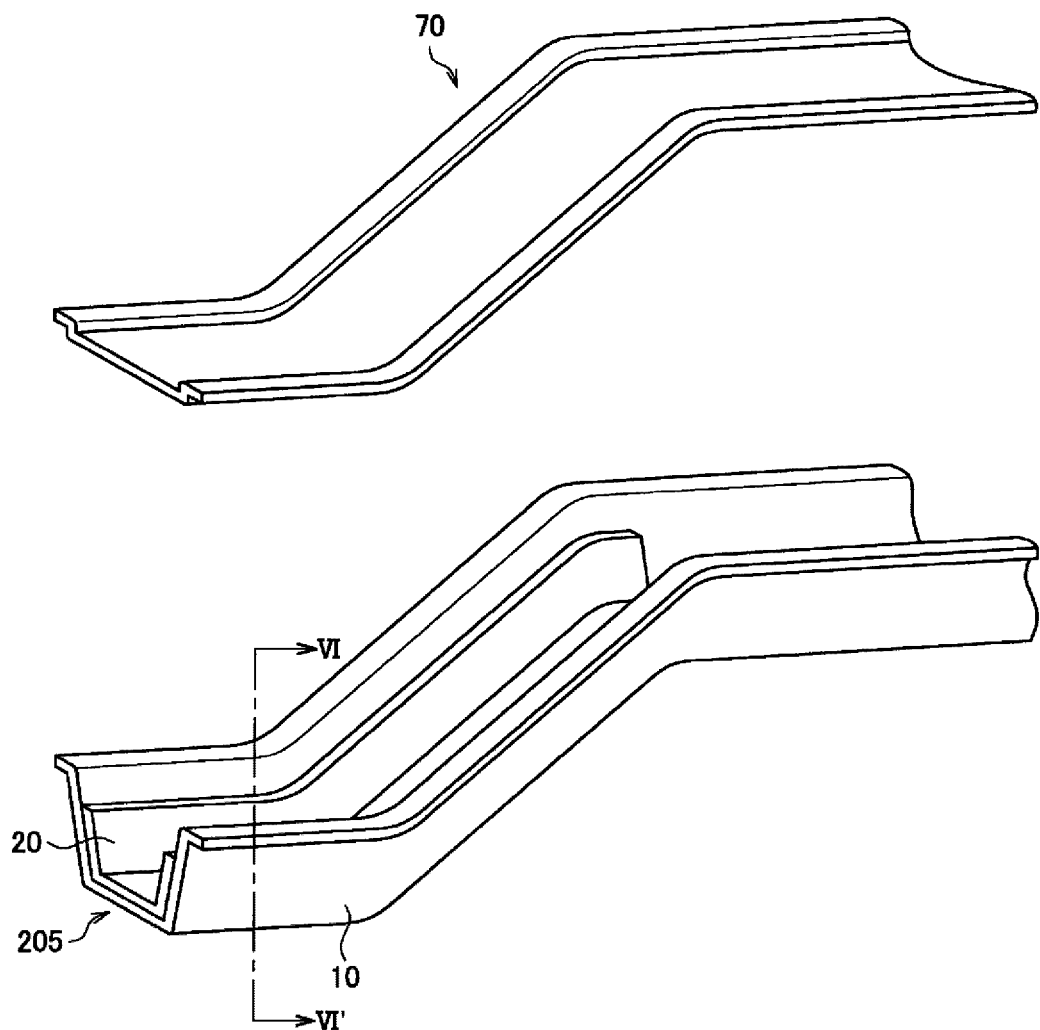
FIG. 15A is an exploded perspective view illustrating one example in which the automotive framework member according to the present embodiment is applied as a rear side member.
Figure 15B:
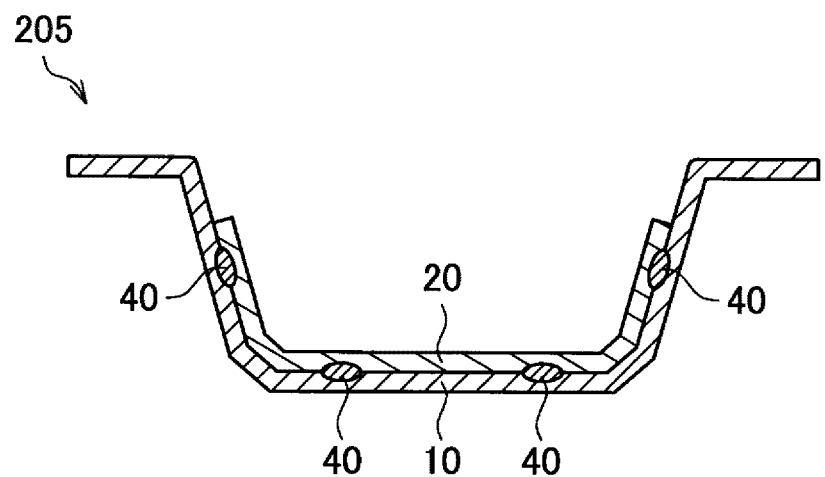
FIG. 15B is a sectional view taken along VI-VI' in FIG. 15A.
Figure 15C:
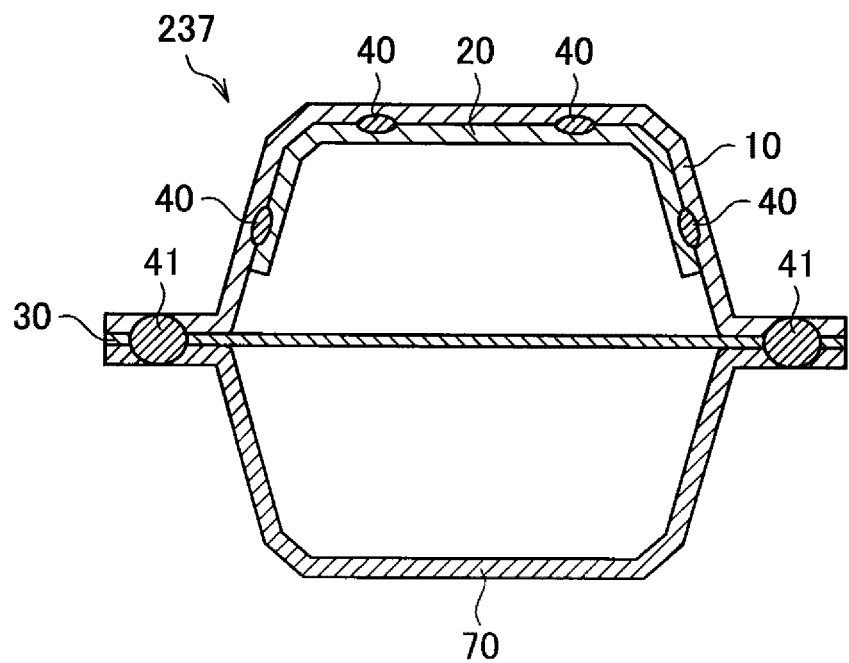
FIG. 15C is a sectional view illustrating one example in which the automotive framework member according to the present embodiment is applied as a floor member.

Next, FIG. 15A is an exploded perspective view illustrating one example in which the framework member 1 according to the present embodiment is applied as the rear side member 205. Further, FIG. 15B is a sectional view taken along VI-VI' in FIG. 15A. Further, FIG. 15C is a sectional view illustrating one example in which the framework member according to the present embodiment is applied as a floor member 237. The floor member 237 is a columnar member extending in the front-rear direction or the width direction of the vehicle body at a lower surface of the vehicle body, and forming a floor. The rear side member 205 is a columnar member that forms a floor at the rear of the vehicle body, in particular. The framework member 1 according to the present embodiment is applied to the rear side member 205 or the floor member 237.

As illustrated in FIG. 15A and FIG. 15B, to an inner side of the first steel sheet 10 having a substantially hat shape in a cross-sectional view, the second steel sheet 20 in a rectangular shape whose one side is opened in a cross-sectional view, is provided. The second steel sheet 20 is welded to an inner wall surface of the first steel sheet 10 via the first weld metal parts 40.

Further, as illustrated in FIG. 15C, the floor member 237 is formed to have a closed cross section when flange parts of the first steel sheet 10 are welded to a mating member 70 as the third steel sheet. To an inner side of the closed cross section of the floor member 237, the second steel sheet 20 (a member continued from a kick portion of front side member) is provided. The second steel sheet 20 is welded to an inner wall surface of the first steel sheet 10 via the first weld metal parts 40. Further, the mating member 70 is formed in a substantially hat shape in a cross-sectional view. Besides, a plate-shaped member 30 (floor panel) is further provided between the first steel sheet 10 and the mating member 70. Note that a cover member as a fourth member that covers the mating member 70 from the outside, may be further provided.

As described above, when the framework member 1 is used as the cabin framework or the impact absorbing framework, it is possible to reduce deformation when a collision occurs, since the framework member 1 has a sufficient load capacity. Further, deformability of the framework member 1 is also improved, and thus even when a collision of side surface or the like is input in the automotive framework 100, the impact is absorbed due to sufficient deformation, resulting in that the inside of the framework can be protected. The above is the explanation regarding the application examples of the framework member according to the embodiments of the present disclosure.

EXAMPLES

In order to evaluate the characteristics of the framework member 1 according to the present embodiment, the framework member 1 according to the present embodiment was actually produced, and was subjected to characteristic evaluation from various viewpoints. A configuration of cross section of the framework member 1 was set to one illustrated in FIG. 3, a height (the Z direction in FIG. 3) of the framework member 1 was set to 60 mm, a width (the X direction in FIG. 3) of the framework member 1 was set to 80 mm, and a length (the Y direction in FIG. 3) of the framework member 1 was set to 800 mm. In Example, a blank material obtained in a manner that a steel sheet with 1.2 GPa was used as the first steel sheet 10, a steel sheet with 1.8 GPa was used as the second steel sheet 20, and the first steel sheet 10 and the second steel sheet 20 were spot-welded under a predetermined condition, was formed into a substantially hat shape through a hot stamping method. Further, the flange parts 17 of the substantially hat shape were welded to the plate-shaped member 30, to thereby obtain the framework member 1 having a closed cross section.

In Comparative Example 1, as a member that forms an outer shape of the framework member 1 and a reinforcing member, a steel sheet with 1.8 GPa was used. First, each of the members was formed into a substantially hat shape by using the hot stamping method, and then the members were spot-welded to be integrated. Further, flange parts of the substantially hat shape were welded to a plate-shaped member, to thereby, obtain the framework member having a closed cross section.

In Comparative Example 2, a single steel sheet with 1.8 GPa was formed into a substantially hat shape, and partial tempering was performed at flange parts, to thereby reduce hardness. Further, the hat-shaped member was welded to a plate-shaped member at the flange parts, to thereby obtain a framework member having a closed cross section. Note that for the plate-shaped member, a steel sheet in a class of 780 MPa was used.

Regarding each of these framework members, hardness in a periphery of a weld was measured. Further, a crushing test of applying a bending moment to both ends of the framework member, was performed. Evaluation results are summarized in Table 3.

Further, in Comparative Example 2, the single member was formed into the substantially hat shape, so that the rigidity was insufficient, and the evaluation was made as NG. Further, in Comparative Example 2, the single member was used, so that it was not possible to evaluate the joining strength between members. In Comparative Example 2, when the flange parts of the substantially hat shape and the plate-shaped member were welded, it was possible to avoid the local hardness reduction in the periphery of the weld metal part due to the partial tempering of the flange parts, and thus the evaluation was made as OK. In Comparative Example 2, the vertical wall part of the substantially hat shape was formed of the steel sheet with 1.8 GPa and thus provided with high strength, but, since deformability thereof was small, the vertical wall part cracked without being deformed greatly, so that the evaluation was made as NG.

In Example, the two members were welded, so that the rigidity as the whole framework member 1 was sufficient, and the evaluation was made as OK. Further, in Example, from a viewpoint of the joining strength between two members, the change in hardness in the peripheral region 62 of the first weld metal part 40 was set to fall within the predetermined range, so that the hardness reduction did not occur, the joining strength took a sufficient value, and thus the evaluation was made as OK. Further, in Example, when the first steel sheet 10 and the plate-shaped member 30 were welded, since the flange part 17 was formed of the steel sheet with 1.2 GPa, it was possible to reduce the hardness reduc-

TABLE 3

| | RIGIDITY OF FRAMEWORK MEMBER | JOINING STRENGTH BETWEEN MEMBERS | JOINING STRENGTH WITH PLATE-SHAPED MEMBER | STRENGTH OF VERTICAL WALL PART |
| --- | --- | --- | --- | --- |
| COMPARATIVE EXAMPLE 1 | OK (HIGH RIGIDITY) | NG (PRESENCE OF HARDNESS REDUCTION) | NG (WELDING: POOR) | NG (IMPACT ABSORPTION: LOW) |
| COMPARATIVE EXAMPLE 2 | NG (LOW RIGIDITY) | — | OK (WELDING: GOOD) | NG (IMPACT ABSORPTION: LOW) |
| EXAMPLE | OK (HIGH RIGIDITY) | OK (ABSENCE OF HARDNESS REDUCTION) | OK (WELDING: GOOD) | OK (IMPACT ABSORPTION: HIGH) |

As illustrated in Table 3, in Comparative Example 1, since the two members were welded, the rigidity as the framework member was sufficient and thus the evaluation was made as OK. On the other hand, in Comparative Example 1, from a viewpoint of the joining strength between the two members, the hardness reduction of the heat affected zone in the periphery of the first weld metal part 40 occurred due to heat input during the spot welding, so that it was not possible to obtain a sufficient value of the joining strength, and the evaluation was made as NG. Further, in Comparative Example 1, when the flange parts of the substantially hat shape and the plate-shaped member were welded, the hardness reduction in the heat affected zone in the periphery of the first weld metal part 40 and the strength reduction of the first weld metal part 40 occurred significantly, and the evaluation was made as NG. It can be considered that this is because the substantially hat-shaped member in Comparative Example 1 is formed of the steel sheet with 1.8 GPa so that softening of the heat affected zone significantly occurs, and a carbon component in the steel sheet is relatively high so that the first weld metal part 40 fractures greatly. Further, in Comparative Example 1, the vertical wall part of the substantially hat shaped-member was formed of the steel sheet with 1.8 GPa and thus provided with high strength, but, since deformability thereof was small, the vertical wall part cracked without being deformed greatly, so that the evaluation was made as NG.

tion in the heat affected zone in the periphery of the second weld metal part 41 at the flange part 17. Further, the first steel sheet 10 had a relatively small carbon component, so that it was possible to suppress the toughness reduction in the second weld metal part 41 at the flange part 17. Therefore, the joining strength with the plate-shaped member 30 was not reduced, and thus the evaluation was made as OK. In Example, the first vertical wall part 15 was also formed of the steel sheet with 1.2 GPa, and thus had large deformability, so that it was deformed greatly with respect to the impact load, and had a large impact energy absorption, resulting in that the evaluation was made as OK. As described above, it was shown that the framework member 1 according to the present embodiment has high performance from various viewpoints.

Although the preferred embodiments of the present disclosure have been described above in detail while referring to the attached drawings, the present disclosure is not limited to such examples. It should be understood that various changes or modifications are readily apparent to those having ordinary knowledge in the technical field to which the present disclosure pertains within the scope of the technical spirit as set forth in claims, and those should also be covered by the technical scope of the present disclosure as a matter of course.

For example, in the above-described embodiments, it is designed that the flange parts 17 are welded to the plate-shaped member 30, but, the present disclosure is not limited to such an example. For example, it is also possible to design such that end portions of the first vertical wall parts 15 are directly welded to the plate-shaped member 30 with no flange parts 17 interposed therebetween. Further, it is also possible that, for example, not the plate-shaped member 30 but the mating member is a member having flange parts and thus having a cross section in a hat shape, and the flange parts 17 of the framework member 1 according to the present embodiment are welded to the flange parts of the mating member. As the plate-shaped member 30, there can be cited, as one example, one or more of formed steel sheet having a sheet thickness of 0.6 mm to 2.6 mm and tensile strength of 270 MPa to 1600 MPa. A surface of the steel sheet of the plate-shaped member 30 may not be plated, or may also be subjected to plating such as zinc-based plating or aluminum-based plating. Further, as a welding method, there can be cited spot welding, laser welding, arc welding, use of the spot welding and the laser welding in a combined manner, use of the spot welding and the arc welding in a combined manner, use of the spot welding and mechanical joining using bolts, screws, rivets, or the like in a combined manner, and use of the spot welding and a sealer or an adhesive in a combined manner. Further, the second weld metal part 41 at this time may be provided in not only a dot shape but also a C-shape, a U-shape, an elliptical shape, a line shape having a predetermined length, or a zigzag shape.

EXPLANATION OF CODES 1 framework member
10 first steel sheet
11 first top wall part
13 first bent part
15 first vertical wall part
17 flange part
18 groove part
20 second steel sheet
21 second top wall part
23 second bent part
25 second vertical wall part
30 plate-shaped member (third steel sheet)
40 first weld metal part
41 second weld metal part
62 peripheral region (region)
70 mating member (third steel sheet)

What is claimed is:

1. An automotive framework member, comprising:
a first steel sheet; a second steel sheet; and a first weld metal part joining an interface between the first steel sheet and the second steel sheet, wherein:
tensile strength of the first steel sheet is 1.0 GPa or more and 1.6 GPa or less;
tensile strength of the second steel sheet is 1.8 GPa or more and 2.5 GPa or less;
the first steel sheet includes a groove part;
the second steel sheet is overlapped with the groove part; and
a minimum Vickers hardness of a region within 4 mm of a periphery of the first weld metal part of the second steel sheet is 80% or more of a hardness of an outside of the region of the second steel sheet.

2. The automotive framework member according to claim 1, wherein
the Vickers hardness of the first weld metal part is 400 or more and 540 or less.

3. The automotive framework member according to claim 1, wherein:
the first steel sheet includes flange parts on outer sides of the groove part; and
the automotive framework member further comprises a third steel sheet, and second weld metal parts joining interfaces between the third steel sheet and the flange parts, wherein
tensile strength of the third steel sheet is 0.45 GPa or more and 1.6 GPa or less.

4. The automotive framework member according to claim 2, wherein:
the first steel sheet includes flange parts on outer sides of the groove part; and
the automotive framework member further comprises a third steel sheet, and second weld metal parts joining interfaces between the third steel sheet and the flange parts, wherein
tensile strength of the third steel sheet is 0.45 GPa or more and 1.6 GPa or less.

* * * * *